United States Patent
Hiwada et al.

(10) Patent No.: US 9,253,377 B2
(45) Date of Patent: Feb. 2, 2016

(54) IMAGE PROCESSING DEVICE AND IMAGE PROCESSING SYSTEM WHERE DE-MOSAIC IMAGE IS GENERATED BASED ON SHIFT AMOUNT ESTIMATION OF PIXELS OF CAPTURED IMAGES

(71) Applicant: KABUSHIKI KAISHA TOSHIBA, Minato-ku, Tokyo (JP)

(72) Inventors: Kazuhiro Hiwada, Yokohama (JP); Katsuyuki Kimura, Kamakura (JP); Tatsuya Mori, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 176 days.

(21) Appl. No.: 13/766,563

(22) Filed: Feb. 13, 2013

(65) Prior Publication Data

US 2014/0009634 A1 Jan. 9, 2014

(30) Foreign Application Priority Data

Jul. 6, 2012 (JP) .................................. 2012-152939

(51) Int. Cl.
*H04N 5/225* (2006.01)
*H04N 9/04* (2006.01)
*G06T 3/40* (2006.01)

(52) U.S. Cl.
CPC .............. *H04N 5/225* (2013.01); *G06T 3/4015* (2013.01); *H04N 9/045* (2013.01); *H04N 2209/045* (2013.01)

(58) Field of Classification Search
None
See application file for complete search history.

(56) References Cited

U.S. PATENT DOCUMENTS

| | | | |
|---|---|---|---|
| 7,680,411 B2 | 3/2010 | Ye | |
| 8,035,725 B2 * | 10/2011 | Chen et al. | 348/349 |
| 8,542,290 B2 | 9/2013 | Ogasahara | |
| 8,724,015 B2 | 5/2014 | Yoshino | |
| 8,749,694 B2 * | 6/2014 | Georgiev et al. | 348/345 |
| 2007/0116447 A1 | 5/2007 | Ye | |
| 2010/0150455 A1 * | 6/2010 | Oyama | 382/219 |
| 2011/0080487 A1 | 4/2011 | Venkataraman et al. | |

(Continued)

FOREIGN PATENT DOCUMENTS

| | | |
|---|---|---|
| JP | 2005-109623 A | 4/2005 |
| JP | 2006-171149 A | 6/2006 |

(Continued)

OTHER PUBLICATIONS

Japanese Office Action for corresponding Japanese Application No. 2012-152939, mailed Jun. 2, 2015 in 5 pages.

*Primary Examiner* — Shahbaz Nazrul

(74) *Attorney, Agent, or Firm* — Knobbe, Martens, Olson & Bear LLP

(57) ABSTRACT

According to one embodiment, an image processing device includes a shift estimator, and a de-mosaic module. The shift estimator is configured to estimate a shift amount between a first pixel in a first image and a corresponding second pixel in a second image. The first image is taken by a first image pickup apparatus, and the second image is taken by a second image pickup apparatus. A focus position of the first image pickup apparatus is different from a focus position of the second image pickup apparatus. The de-mosaic module is configured to generate a first de-mosaic image by performing de-mosaic processing on each pixel in the first pixel using a pixel value of the corresponding second pixel, when the first pixel is determined to be in a state of in-focus based on the shift amount.

16 Claims, 19 Drawing Sheets

(56) References Cited

U.S. PATENT DOCUMENTS

| | | |
|---|---|---|
| 2011/0115965 A1* | 5/2011 | Engelhardt et al. ........... 348/345 |
| 2011/0122308 A1 | 5/2011 | Duparre |
| 2011/0279699 A1* | 11/2011 | Matsui ....................... 348/222.1 |
| 2012/0098939 A1* | 4/2012 | Hirasawa ........................ 348/47 |
| 2012/0105691 A1 | 5/2012 | Waqas et al. |
| 2013/0027587 A1* | 1/2013 | Matsui et al. ................. 348/241 |
| 2013/0033582 A1* | 2/2013 | Sun et al. ...................... 348/47 |

FOREIGN PATENT DOCUMENTS

| | | |
|---|---|---|
| JP | 2007-142949 A | 6/2007 |
| JP | 2008-172523 A | 7/2008 |
| JP | 2011-097288 A | 5/2011 |
| JP | 2011-135359 | 7/2011 |
| JP | 2012-039255 | 2/2012 |

\* cited by examiner

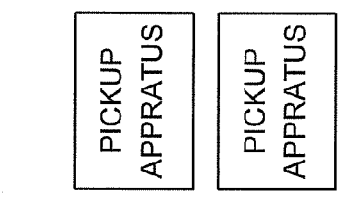
FIG. 22G
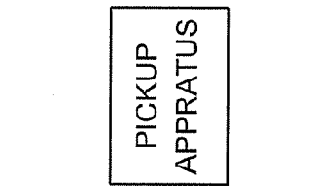
FIG. 22H
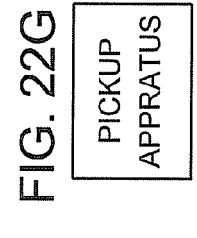
FIG. 22A
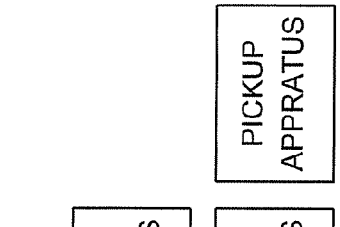
FIG. 22D
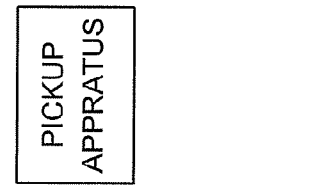
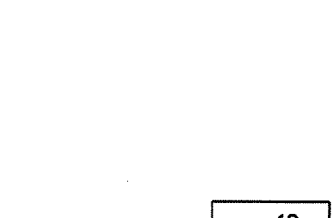
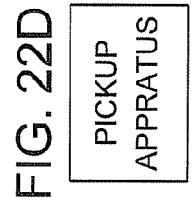
FIG. 22B
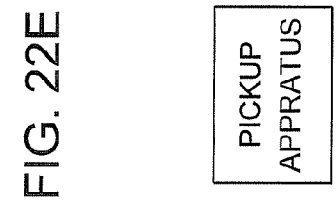
FIG. 22E
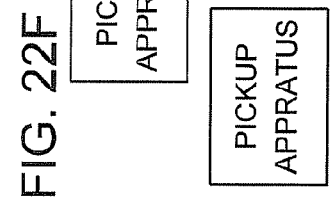
FIG. 22F
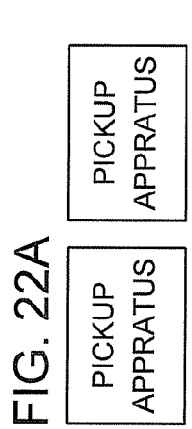
FIG. 22C
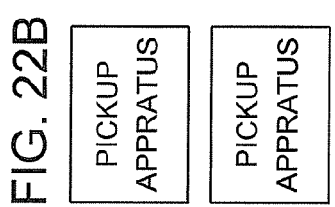
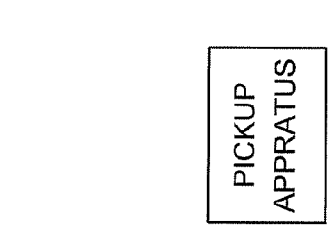

IMAGE PROCESSING DEVICE AND IMAGE PROCESSING SYSTEM WHERE DE-MOSAIC IMAGE IS GENERATED BASED ON SHIFT AMOUNT ESTIMATION OF PIXELS OF CAPTURED IMAGES

CROSS REFERENCE TO RELATED APPLICATIONS

This application is based upon and claims the benefit of priority from the prior Japanese Patent Application No. 2012-152939, filed on Jul. 6, 2012, the entire contents of which are incorporated herein by reference.

FIELD

Embodiments described herein relate generally to an image processing device and an image processing system.

BACKGROUND

In recent years, a camera is mounted in many mobile devices such as mobile phones and it is desired that the camera has high resolution. However, a camera having high resolution is generally large. Therefore, under the present circumstances, there is no other choice but to select either to realize a large mobile device having a high resolution camera or a small mobile device having a low resolution camera.

BRIEF DESCRIPTION OF THE DRAWINGS

FIGS. 22A to 22H are diagrams showing an arrangement example of image pickup apparatuses.

DETAILED DESCRIPTION

In general, according to one embodiment, an image processing device includes a shift estimator, and a de-mosaic module. The shift estimator is configured to estimate a shift amount between a first pixel in a first image and a corresponding second pixel in a second image. The first image is taken by a first image pickup apparatus, and the second image is taken by a second image pickup apparatus. A focus position of the first image pickup apparatus is different from a focus position of the second image pickup apparatus. The de-mosaic module is configured to generate a first de-mosaic image by performing de-mosaic processing on each pixel in the first pixel using a pixel value of the corresponding second pixel, when the first pixel is determined to be in a state of in-focus based on the shift amount.

Hereinafter, embodiments will be specifically described with reference to the drawings.

First Embodiment

Figure 1:
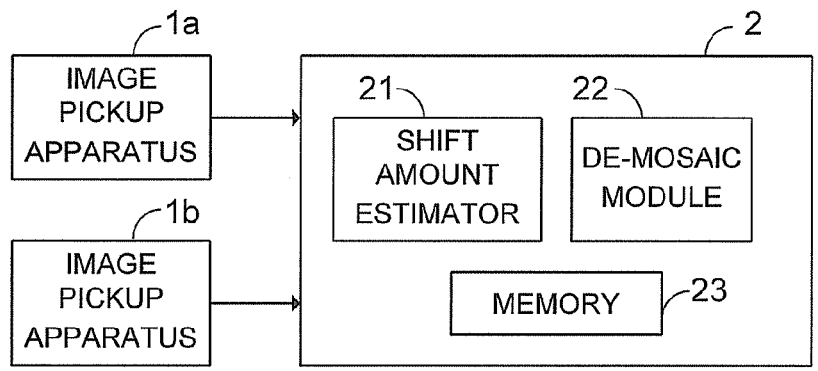
FIG. 1 is a block diagram showing a schematic configuration of an image processing system according to a first embodiment.

FIG. 1 is a block diagram showing a schematic configuration of an image processing system according to a first embodiment. The image processing system includes a plurality of image pickup apparatuses 1a and 1b and an image processing apparatus 2. The image pickup apparatuses 1a and 1b are, for example, CMOS cameras. The image pickup apparatuses 1a and 1b and the image processing apparatus 2 may be formed on the same semiconductor chip to form a camera module. Thereby, a positional shift between the image pickup apparatuses 1a and 1b can be suppressed. Or, the function of the image processing apparatus 2 may be realized by an apparatus separate from the image pickup apparatuses 1a and 1b.

It is assumed that the image pickup apparatuses 1a and 1b are arranged 8 mm apart from each other in the horizontal direction. As common specifications of the image pickup apparatuses 1a and 1b, the following is assumed:
Focal length f=3.1 mm
F number=2.2
Effective aperture D=1.4 mm
Pixel size=1.4 μm
Color filter: Bayer arrangement
The number of pixels: 2560×1920=about 4.9 Million pixels However, the focus positions of the image pickup apparatuses is 1a and 1b are different from each other and they are assumed to be a fixed focus (FF) of 60 cm and 20 cm respectively. In other words, the image pickup apparatuses 1a and 1b can capture an image of an object apart from the lenses thereof by 60 cm and 20 cm respectively in focus. The above assumption is only an example and does not limit the present embodiment.

As described above, in the present embodiment, the image pickup apparatuses 1a and 1b, which are not so high resolution of about 4.9 Million pixels and which are fixed focus, are used. Therefore, the image processing system can be small.

Figure 2:
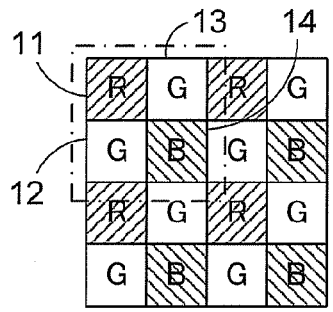
FIG. 2 is a diagram schematically showing an arrangement of image pickup elements in the image pickup apparatuses is 1a and 1b.

FIG. 2 is a diagram schematically showing an arrangement of image pickup elements in the image pickup apparatuses is 1a and 1b. Each of the image pickup apparatuses 1a and 1b includes R image pickup elements, G image pickup elements, and B image pickup elements. Each image pickup element is formed by placing a color filter on a photoelectric conversion element such as a photodiode formed on a semiconductor substrate and samples the intensity of light of a certain wavelength. More specifically, the R image pickup element samples light of long wavelength of visible light, the G image pickup element samples light of medium wavelength, and the B image pickup element samples light of short wavelength.

In the Bayer arrangement, one R image pickup element, one B image pickup element, and two G image pickup elements are included in one unit indicated by a dashed-dotted line in FIG. 2. The intensity of the light sampled by each image pickup element corresponds to one pixel value. In such a Bayer arrangement, color that can be sampled is different for each position. For example, at a position 11 in FIG. 2, only red can be sampled and green and blue cannot be sampled. Therefore, in a pixel corresponding to the position 11, pixel values of green and blue have to be estimated. Similarly, pixel values of red and blue at positions 12 and 13 and pixel values of red and green at position 14 have to be estimated. The estimation process is referred to as de-mosaic processing and performed by the image processing apparatus 2 in FIG. 1.

As obvious from the sampling theorem, when the de-mosaic processing is performed on a high frequency pattern, false color and moiré (hereinafter referred to as artifacts) are generated. Therefore, the present embodiment intends to generate an image where the artifacts are suppressed and which provides a high resolution feeling by using the image pickup apparatuses 1a and 1b that have different focus positions.

Here, a circle of confusion of the image pickup apparatuses 1a and 1b will be described. If an object is an extremely small point, when the object is just in focus, an image of the object is captured by one or a few image pickup elements. On the other hand, when the object is out of focus, the image of the object is captured by a plurality of image pickup elements within a certain radius around one image pickup element. This circle is called a circle of confusion, and the radius thereof is called a size of the circle of confusion. In this way, when the object is in focus, the size of the circle of confusion is small, and the more the object is out of focus, the larger the size of the circle of confusion is. Hereinafter, a state in which the object is focused is called "in focus" and a state in which the object is not focused is called "out of focus".

Figure 3:
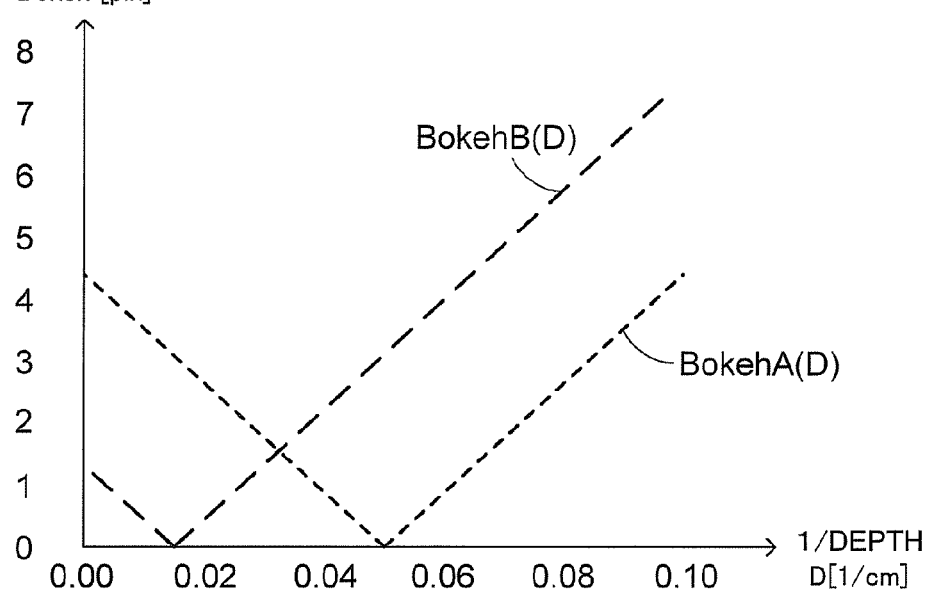
FIG. 3 is a diagram showing a relationship between the size of the circle of confusion of the image pickup apparatuses 1a and 1b and a distance between the object and the image pickup apparatuses 1a and 1b.

FIG. 3 is a diagram showing a relationship between the size of the circle of confusion of the image pickup apparatuses is 1a and 1b and a distance between the object and the image pickup apparatuses is 1a and 1b (hereinafter referred to as "depth D"). The horizontal axis represents the reciprocal of the depth 1/D, and the vertical axis represents the sizes of the circle of confusion BokehA(D) and BokehB(D) when the depth is D. The focus position of the image pickup apparatus is 20 cm (that is, 1/D is 0.05), the size of the circle of confusion BokehA(D) of the image pickup apparatus is smallest, and the more the depth is different from 20 cm, the larger the size of the circle of confusion is. The same goes for the size of the circle of confusion BokehB(D) of the image pickup apparatus 1b.

The relationship shown in FIG. 3 is determined from the specifications of the image pickup apparatuses is 1a and 1b. More specifically, the minimum value of the size of the circle of confusion is determined according to the distance between the lens of the camera and the image pickup elements, and an inclination is determined according to the shape of the lens.

With reference back to FIG. 1, the image processing apparatus 2 includes a shift amount estimator 21, a de-mosaic module 22, and a memory 23. The shift amount estimator 21 estimates a shift amount (hereinafter also referred to as "disparity") between a pixel in an image captured by the image pickup apparatus is (hereinafter referred to as an image "A") and a corresponding pixel in an image captured by the image pickup apparatus 1b (hereinafter referred to as an image "B") for each pixel (or for each block including a plurality of pixels) in the image "A". The de-mosaic module 22 performs de-mosaic processing on the image "A" based on the estimated shift amount. The memory 23 stores the relationship between the sizes of the circle of confusion BokehA(D), BokehB(D) and the depth D shown in FIG. 3.

Here, the greater the depth D is, the smaller the shift amount between a position in the image "A" and a position in the image "B" of the object is. On the other hand, the smaller the depth D is, the greater the shift amount between a position in the image "A" and a position in the image "B" of the object is. In other words, a relationship between the depth D and the shift amount between a position in the image "A" and a position in the image "B" is substantially inverse proportion. Because of this, it can be considered that the horizontal axis in FIG. 3 represents the shift amount. In the description below, it is assumed that the proportionality coefficient is "1" and the reciprocal of the depth is the shift amount for simplicity of explanation.

Next, the shift amount estimator 21 will be described in detail.

It can be considered that the shift amount estimator 21 can detect the shift amount by performing a stereo matching process on the image "A" and the image "B" and searching for a pixel in the image "B" corresponding to each pixel in the A image.

However, the focus positions of the image "A" and the image "B" are different from each other, so that bokeh amounts are different. For example, when a certain pixel in the image "A" is in focus, a corresponding pixel in the B image is out of focus. Therefore, an accurate shift amount cannot necessarily be estimated by a simple stereo matching. Therefore, it is desired that the shift amount estimator 21 performs the process described below and accurately estimates the depth.

Figure 4:
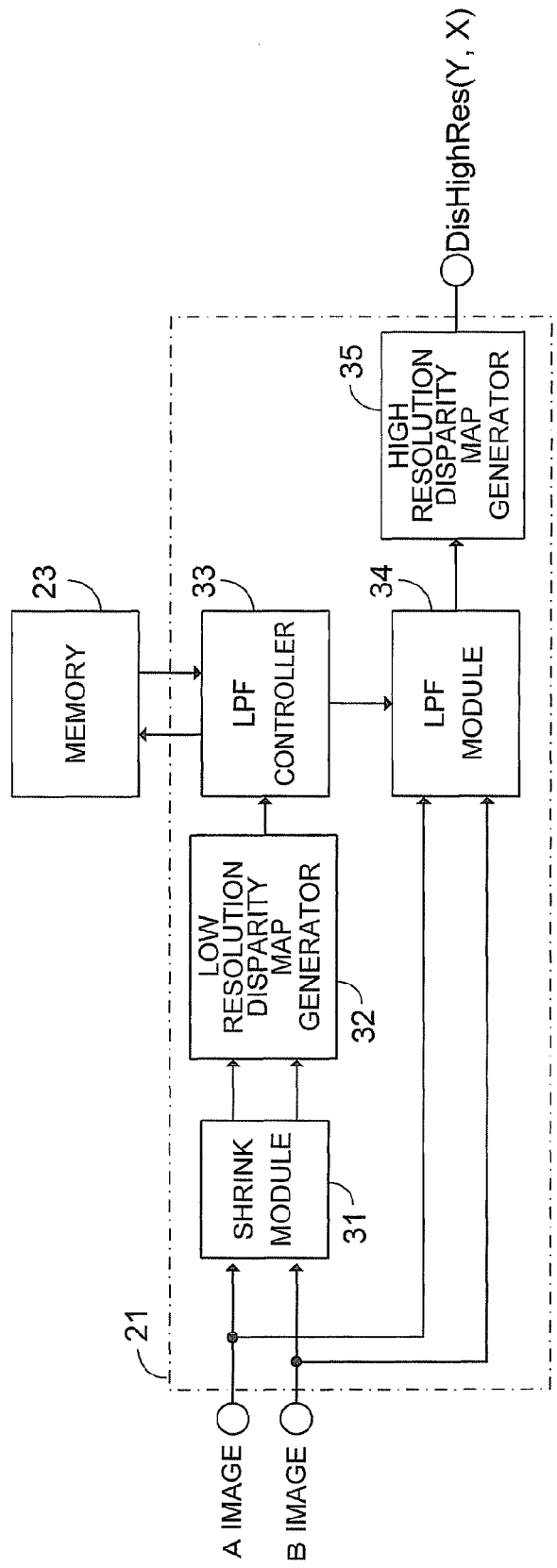
FIG. 4 is a block diagram showing an example of an internal configuration of the shift amount estimator 21.

FIG. 4 is a block diagram showing an example of an internal configuration of the shift amount estimator 21. The shift amount estimator 21 includes a shrink module 31, a low resolution disparity map generator 32, an LPF controller 33, an LPF module 34, a high resolution disparity map generator 35.

The shrink module 31 shrinks the image "A" and the image "B" at a predetermined constant shrink rate and generates shrunk image "A" and image "B" (hereinafter referred to as a shrunk image "A" and a shrunk image "B" respectively). The low resolution disparity map generator 32 performs a stereo matching process on the shrunk image "A" and the shrunk image "B" and generates a low resolution disparity map DisLowRes(y, x) of the shrunk image "A". The low resolution disparity map DisLowRes(y, x) indicates a shift amount of a pixel at a position (y, x) (that is, a y-th position in the vertical direction and an x-th position in the horizontal direction in an image, the same goes for the description below) in the shrunk image "A" with respect to a pixel in the shrunk image "B" corresponding to the pixel in the shrunk image "A".

The LPF controller 33 controls the LPF module 34 by using the low resolution disparity map DisLowRes(y, x) and the relationship of FIG. 3 stored in the memory 23. The LPF module 34 performs a low pass filtering process according to the control of the LPF controller 33 on the image "A" and the image "B" and generates the image "A" and the image "B" whose high frequency component is cut (hereinafter referred to as "LPF(A) image" and "LPF(B) image" respectively). The high resolution disparity map generator 35 performs a stereo matching process on the LPF(A) image and the LPF(B) image and generates a high resolution disparity map DisHighRes(Y, X) of the image "A". The high resolution disparity map DisHighRes(Y, X) indicates a shift amount of a pixel at a position (Y, X) in the image "A" with respect to a pixel in the image "B" corresponding to the pixel in the image "A".

Figure 5:
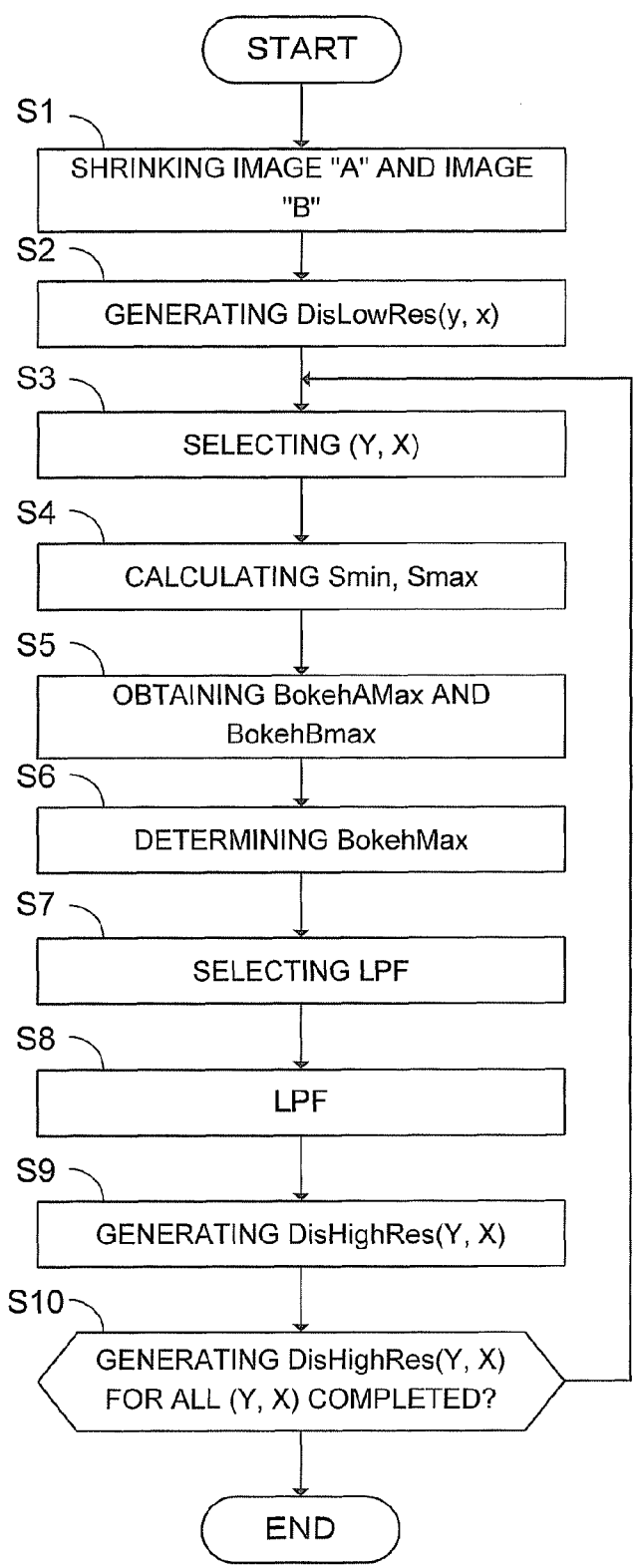
FIG. 5 is a flowchart showing an example of a processing operation of the shift amount estimator 21.

FIG. 5 is a flowchart showing an example of a processing operation of the shift amount estimator 21. Note that, before the processing operation of FIG. 5, lens distortion may be corrected with respect to the image "A" and the image "B" and a difference between the angles of view of both images caused by the difference of the focus positions may be corrected in advance.

First, the shrink module 31 shrinks the image "A" and the image "B" at a predetermined constant shrink rate and generates the shrunk image "A" and the shrunk image "B" (S1).

Figure 6:
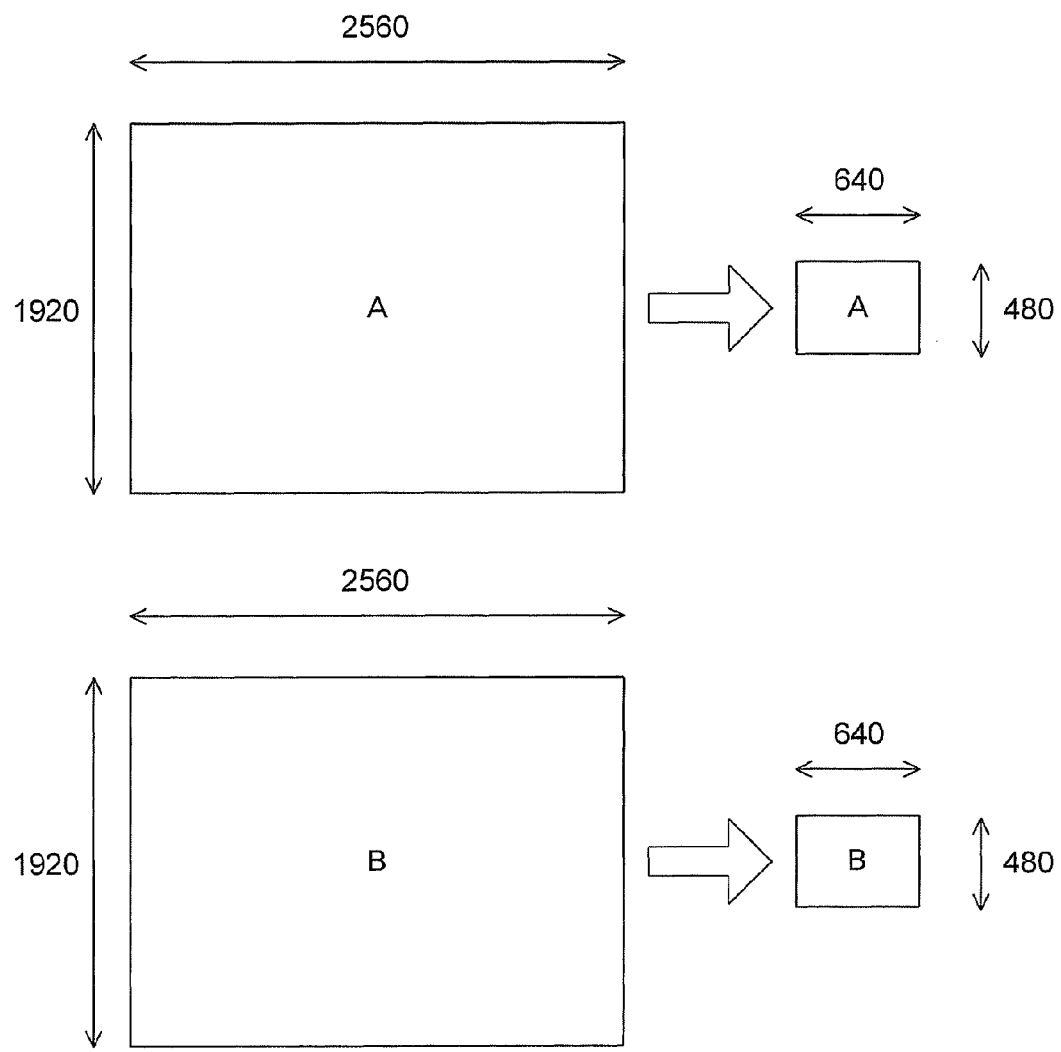
FIG. 6 is a diagram for explaining a processing operation of the shrink module 31.

FIG. 6 is a diagram for explaining a processing operation of the shrink module 31. For example, the shrink module 31 shrinks the image "A" and the image "B" with a resolution of 2560×1920 at a shrink rate of 1/4 to generate the shrunk image "A" and the shrunk image "B" with a resolution of 640×480.

Subsequently, the low resolution disparity map generator 32 performs a stereo matching process and generates a low resolution disparity map DisLowRes(y, x) of the shrunk image "A" (S2). When the image pickup apparatuses 1a and 1b are arranged side by side in the horizontal direction, only the horizontal direction has to be searched in the stereo matching process, thereby, reducing line memory. In the shrunk image "A" and the shrunk image "B", the difference of bokeh amount between the image "A" and the image "B" does not matter so much.

Figure 7:
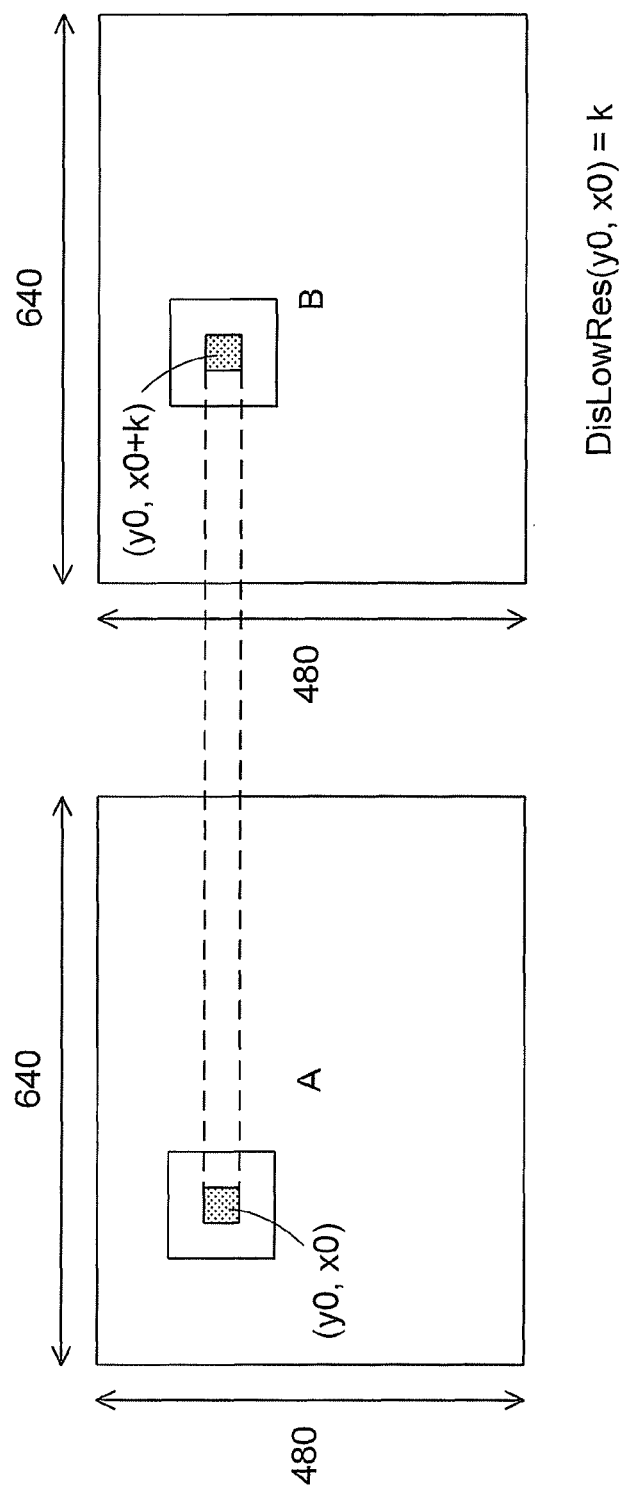
FIG. 7 is a diagram for explaining a processing operation of the low resolution disparity map generator 32.

FIG. 7 is a diagram for explaining a processing operation of the low resolution disparity map generator 32. When a block around a position (y0, x0) in the shrunk image "A" corresponds to a block around a position (y0, x0+k) in the shrunk image "B", a formula DisLowRes(y0, x0)=k is set. To search for a corresponding block, for example, a block in the shrunk image "B", in which a sum of absolute differences (SAD) between each pixel in a block in the shrunk image "A" and each pixel in the block in the shrunk image "B" is smallest, may be searched for. The search may be performed by using other indexes such as a sum of squared differences (SSD) between each pixel in a block in the shrunk image "A" and each pixel in a block in the shrunk image "B", instead of the SAD. When a corresponding block is not detected, exception handling such as interpolation from surrounding areas may be properly performed.

The above process is performed on all positions (y, x) in the shrunk image "A", so that the low resolution disparity map DisLowRes(y, x) with a resolution of 640×480, which indicates a shift amount of a pixel at a position (y, x) in the shrunk image "A" with respect to the corresponding pixel in the shrunk image "B", is generated. As described above, the shift amount indicated by the low resolution disparity map DisLowRes(y, x) is in inverse proportion to the depth.

The low resolution disparity map DisLowRes(y, x) is generated by using the shrunk image "A" and the shrunk image "B", so that the accuracy of the shift amount is not necessarily high. Therefore, the shift amount estimator 21 generates the high resolution disparity map DisHighRes(Y, X), which is high resolution and whose accuracy of the shift amount is improved, as described below by using the generated low resolution disparity map DisLowRes(y, x) and the relationship shown in FIG. 3.

First, the LPF controller 33 selects one position (Y, X) in the image "A" (S3). Although the position (Y, X) may be selected in any order, for example, it is assumed that the position (Y, X) is selected in order of raster scan from upper left to lower right.

Here, it is assumed that an error of the shift amount of the low resolution disparity map DisLowRes(y, x) is ±Serr. The value of the error Serr is determined in advance. When the shrink rate is 1/4, it is considered that DisHighRes(Y, X), which indicates the shift amount of the position (Y, X) in the image "A", is within a range from Smin to Smax as shown by the Formula (1) described below.

$$Smin \leq DisHighRes(Y,X) \leq Smax$$

$$Smin = DisLowRes(Y/4, X/4) - Serr$$

$$Smax = DisLowRes(Y/4, X/4) + Serr \quad (1)$$

Further, by using that the shift amount corresponds to the reciprocal of the depth D, the shift amount estimator 21 obtains maximum values BokehAMax and BokehBMax of the size of the circle of confusion (FIG. 3) of the image pickup apparatuses is 1a and 1b within the above range.

Figure 8:
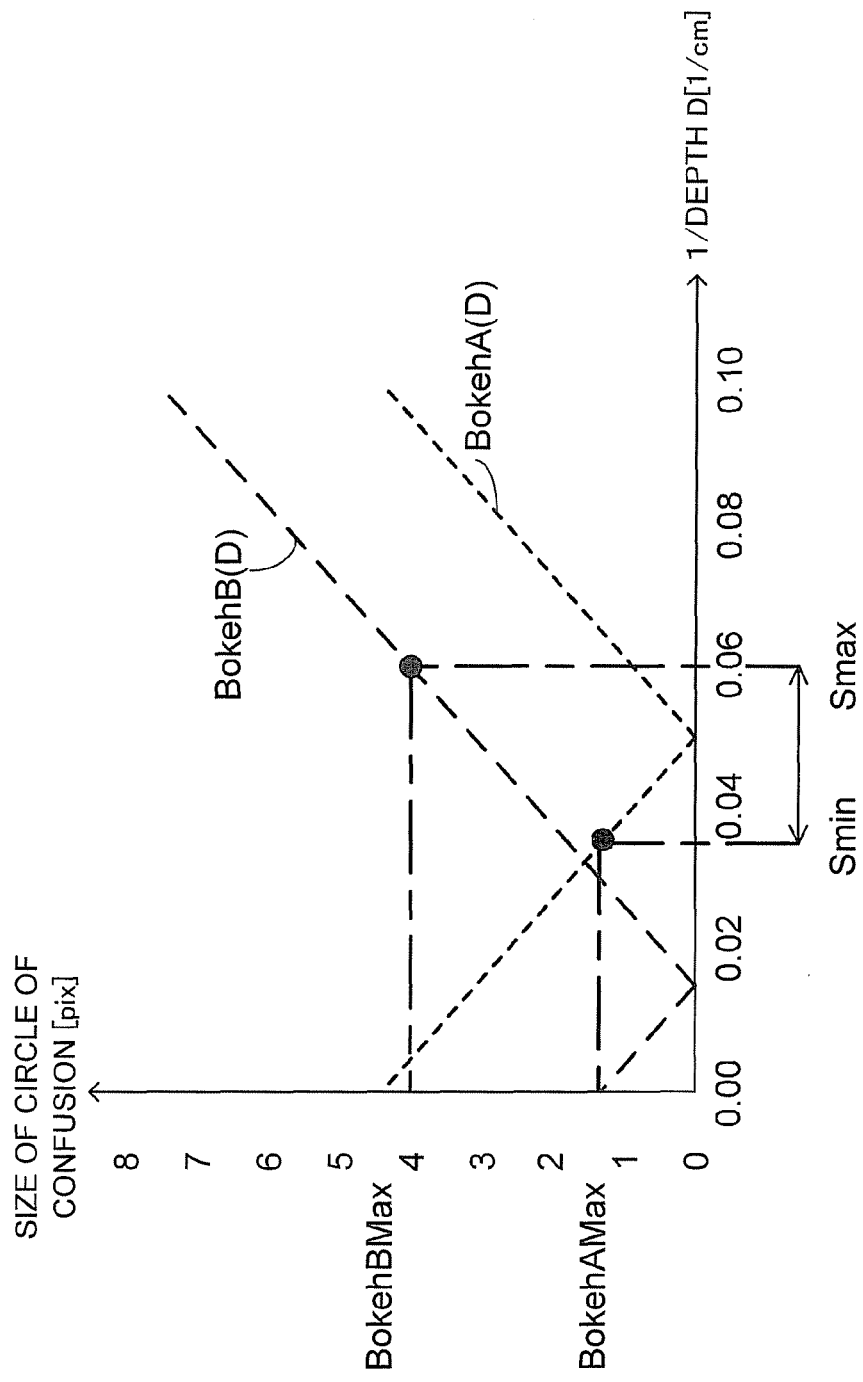
FIG. 8 is a diagram for explaining a processing operation of the LPF controller 33.

FIG. 8 is a diagram for explaining a processing operation of the LPF controller 33. In the example of the range from Smin to Smax shown in FIG. 8, in the image pickup apparatus 1a, when the shift amount is the minimum value 5 min, the size of the circle of confusion is the maximum value BokehAMax, and in the image pickup apparatus 1b, when the shift amount is the maximum value Smax, the size of the circle of confusion is the maximum value BokehBMax.

The LPF controller 33 determines that the maximum value of the BokehAMax and the BokehBMax is set to be Bokeh-Max (S6). The LPF controller 33 selects an LPF to be applied to the image "A" and the image "B" on the basis of the BokehMax (S7). More specifically, the LPF controller 33 selects the LPF so that a circle of confusion of an LPF(A) image and an LPF(B) image, which are obtained by a low pass filter process, has spatial frequency characteristics similar to the BokehMax. For example, the LPF controller 33 may select a Gaussian filter with a radius of BokehMax for the image "A" and the image "B". Or, the LPF controller 33 may select difference LPFs for image "A" and the image "B". For example, when BokehAMax>BokehBMax and the image "A" has more bokeh, the LPF controller 33 may select a stronger LPF for the image "B".

Subsequently, the LPF module 34 performs a low pass filter process on the image "A" and the image "B" by using the selected LPF and generates an LPF(A) image and an LPF(B) image respectively (S8).

Figure 9:
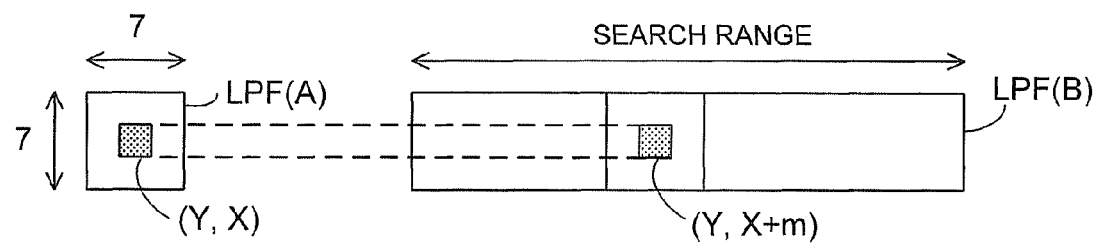
FIG. 9 is a diagram for explaining a processing operation of the LPF module 34.

FIG. 9 is a diagram for explaining a processing operation of the LPF module 34. The LPF module 34 performs a low pass filter process on a part of the image "A" and generates a block of LPF(A) image having a predetermined size (7×7 pixels in FIG. 9) around the position (Y, X). Of course, pixels outside the block in the image "A" may be used for the low pass filter process. On the other hand, the LPF module 34 performs a low pass filter process on a part of the image "B" and generates an LPF(B) image which includes the position (Y, X), has the same number of pixels as that of the block in the vertical direction, and has the number of pixels that correspond to a search range in the horizontal direction.

The high resolution disparity map generator 35 performs a stereo matching process on the generated LPF(A) image and the LPF(B) image and generates a high resolution disparity map DisHighRes(Y, X) (S9). As shown in FIG. 9, when a block around the position (Y, X) in the LPF(A) image corresponds to a block around the position (Y, X+m) in the LPF(B) image, a formula DisHighRes(Y, X)=m is set. To search for a corresponding block, for example, a block in the LPF(B) image, in which a sum of absolute differences (SAD) between each pixel in a block in the LPF(A) image and each pixel in the block in the LPF(B) image is smallest, may be searched for. When a corresponding block is not detected, exception handling such as interpolation from surrounding areas may be properly performed.

The above process is performed on pixels at all positions in the image "A" (S10). In this way, the shift amount estimator 21 can generate the high resolution disparity map DisHighRes(Y, X) with a resolution of 2560×1920 that is the same as that of the image "A".

Although the above process may be directly performed on the image "A" and the image "B", before the process of the shift amount estimator 21, the image "A" and the image "B" may be converted into images on which the stereo matching process of the low resolution disparity map generator 32 and the high resolution disparity map generator 35 can be easily performed. For example, the shift amount estimator 21 may generate a luminance signal Y of the image "A" and the image "B" and perform processing on the image "A" and the image "B" which include only the luminance signal Y. For example, the luminance signal Y can be generated by performing a convolution described by the formula below on 3×3 pixels.

$$Y = \Sigma a_{ij} * k_{ij} / 16$$

In this formula, $a_{ij}$ (i, j=0 to 2) is a pixel value of each pixel and $k_{ij}$ is a predetermined coefficient. For example, it is assumed that $(k_{00}, k_{01}, k_{02}, k_{10}, k_{11}, k_{12}, k_{20}, k_{21}, k_{22}) = (1, 2, 1, 2, 4, 2, 1, 2, 1)$. According to the above formula, even when the R, G, and B pixels are arranged in any format in 3×3 pixels, weight of R and that of G is the same, which is ½ of the weight of G.

Alternatively, the shift amount estimator 21 may perform processing on the image "A" and the image "B" on which simple de-mosaic processing is performed (without considering resolution feeling and generation of artifacts).

It is possible to perform stereo matching more accurately by using an image on which de-mosaic processing is performed and/or the luminance signal than when using the Bayer arrangement in which only the R, G, or B pixel is present at each pixel.

Next, the de-mosaic module 22 will be described in detail.

Generally, when the de-mosaic processing is performed on an in-focus image, artifacts may occur. This is because the in-focus image includes high-frequency components. Therefore, the artifacts can be suppressed by performing the de-mosaic processing after removing the high-frequency components. However, the generated image, on which the de-mosaic processing, is performed loses high-frequency components and the resolution decreases.

Therefore, in the present embodiment, an in-focus image and an out-of-focus image are used in the manner as described below, so that the de-mosaic processing is performed which suppresses artifacts and does not lose high-frequency components.

Figure 10:
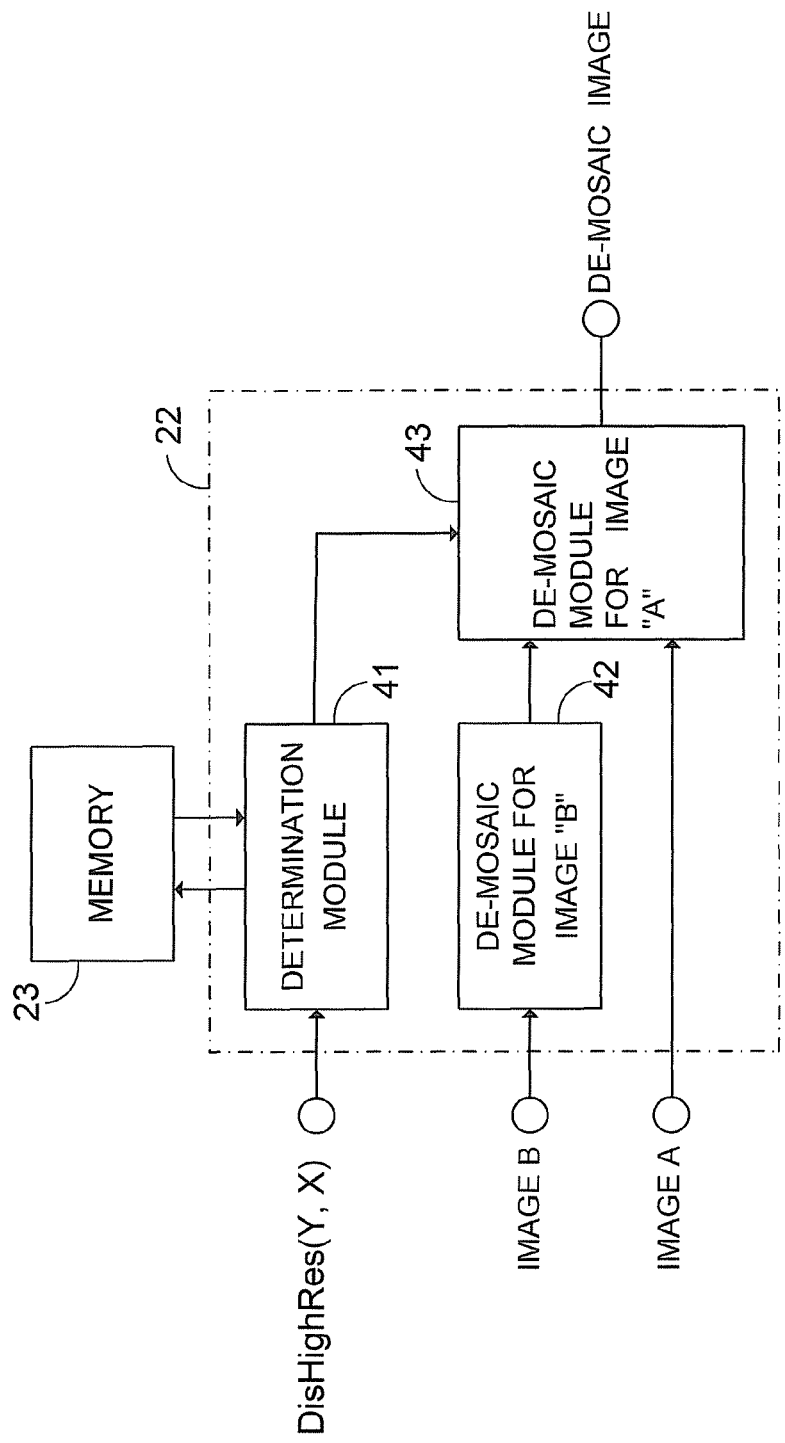
FIG. 10 is a block diagram showing an example of an internal configuration of the de-mosaic module 22.

FIG. 10 is a block diagram showing an example of an internal configuration of the de-mosaic module 22. The de-mosaic module 22 includes a determination module 41, a de-mosaic module for image "B" 42, and a de-mosaic module for image "A" 43.

The determination module 41 determines whether a pixel in the image "A" which is a target of the de-mosaic processing (hereinafter referred to as a "de-mosaic target pixel") is in focus or out of focus by using the high resolution disparity map DisHighRes(Y, X) and the relationship of FIG. 3 stored in the memory 23.

The de-mosaic module for image "B" 42 performs the de-mosaic processing on the image "B". The de-mosaic module for image "A" 43 performs the de-mosaic processing on the image "A". In the de-mosaic processing on the image "A", the de-mosaic module for image "A" 43 does not use a de-mosaic result of the image "B" when the de-mosaic target pixel is out of focus, and uses the de-mosaic result of the image "B" when the de-mosaic target pixel is in focus.

Figure 11:
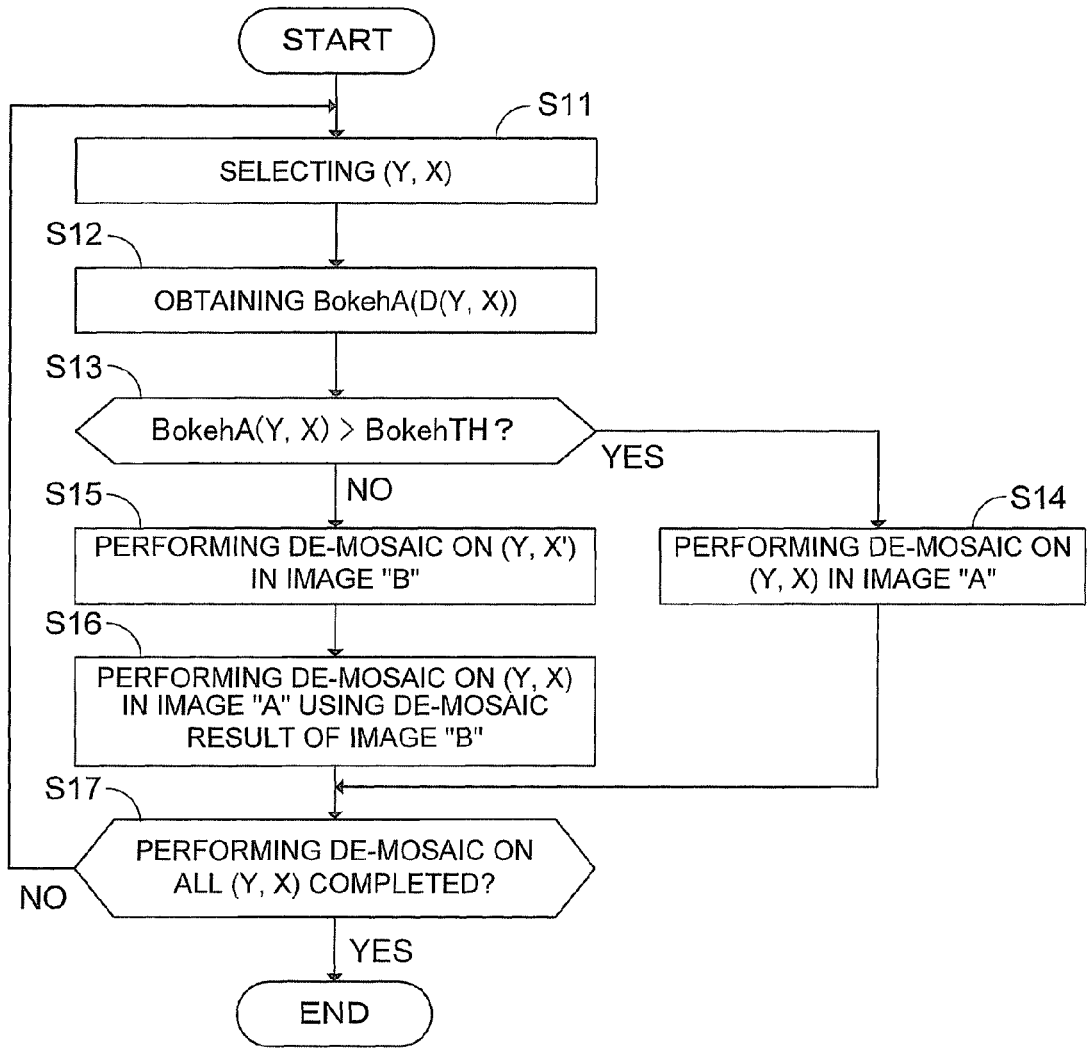
FIG. 11 is a flowchart showing an example of a processing operation of the de-mosaic module 22.

FIG. 11 is a flowchart showing an example of a processing operation of the de-mosaic module 22. The flowchart in FIG. 11 shows the de-mosaic processing performed on the image "A" where the high resolution disparity map DisHighRes(Y, X) is generated (for example, processing for estimating pixel values of green and blue at the position 11 in FIG. 2, pixel values of red and blue at the positions 12 and 13, and pixel values of green and red at the position 14).

First, the determination module 41 selects a position (V, X) in the image "A" which is a target of the de-mosaic processing (S11). Although the position (Y, X) may be selected in any order, for example, it is assumed that the position (Y, X) is selected in order of raster scan from upper left to lower right. The position (Y, X) corresponds to a position of any one of the image pickup elements such as, for example, the position 11 in FIG. 2.

Subsequently, the determination module 41 obtains the high resolution disparity map DisHighRes(Y, X). This corresponds to the reciprocal of the depth D(Y, X) at the position (Y, X). Further, the determination module 41 obtains the size of the circle of confusion BokehA(D(Y, X)) at 1/depth D(Y, X) by using the relationship of FIG. 3 stored in the memory 23. In this way, the determination module 41 can obtain the size of the circle of confusion BokehA(D(Y, X)) of the image "A" from the position (Y, X) (S12).

Further, the determination module 41 compares the size of the circle of confusion BokehA(D(Y, X)) and a predetermined threshold value BokehTH (S13).

Figure 12:
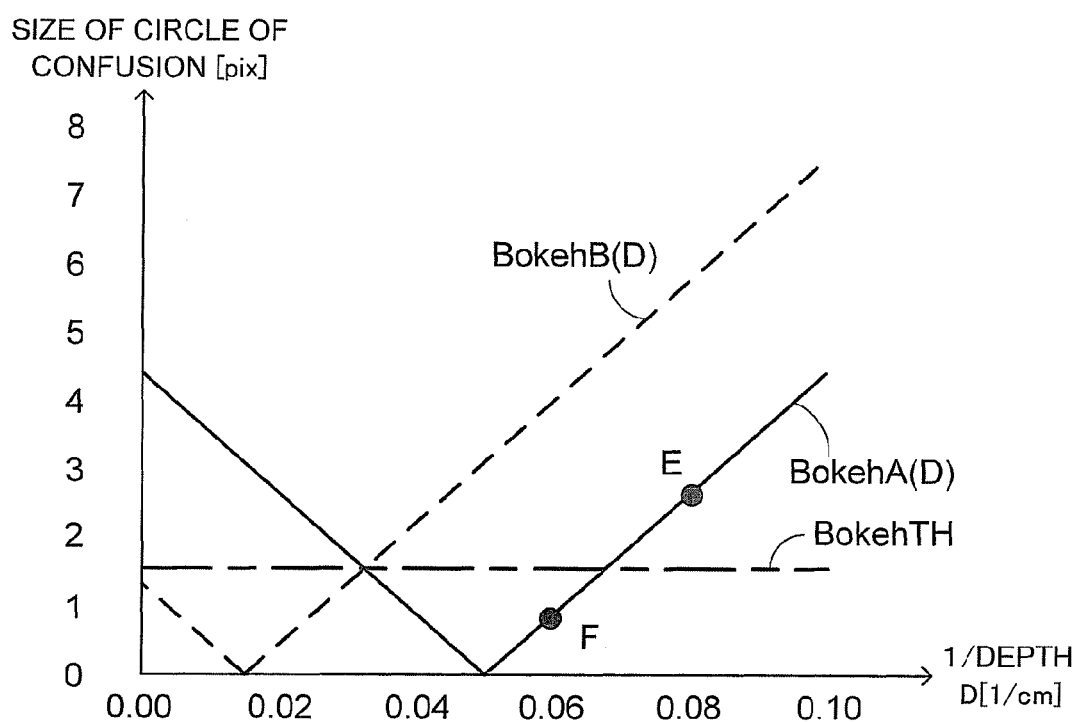
FIG. 12 is a diagram for explaining a processing operation of the determination module 41.

FIG. 12 is a diagram for explaining a processing operation of the determination module 41. As indicated by a point E in FIG. 12, when the size of the circle of confusion BokehA(D(Y, X)) is greater than the threshold value BokehTH (YES in S13), it is determined that the image "A" is not focused (out of focus). In other words, information with high spatial frequencies is not included in an area near the point (Y, X). Therefore, even in normal de-mosaic processing, artifacts hardly occur. The normal de-mosaic processing is a known manner such as, for example, an advanced color plane interpolation (ACPI) and a linear interpolation, in which the de-mosaic processing is performed without using the image "B".

On the other hand, as indicated by a point F in FIG. 12, when the size of the circle of confusion BokehA(D(Y, X)) is smaller than or equal to the threshold value BokehTH (NO in S13), it is determined that the image "A" is focused. In other words, information with high spatial frequencies may be included in an area near the point (Y, X). Therefore, in normal de-mosaic processing, artifacts may occur. Here, the focus positions of the image pickup apparatuses 1a and 1b are different from each other, so that when the image "A" is in focus, the image "B" is out of focus. Therefore, the de-mosaic module 22 performs the de-mosaic processing by using the image "B" which is out of focus.

When considering the high resolution disparity map DisHighRes(Y, X) generated by the shift amount estimator 21, a position in the image "B" corresponding to the position (Y, X) in the image "A" is (Y, X+DisHighRes(Y, X)) (hereinafter, this position is represented as (Y, X')). The de-mosaic module for image "B" 42 first performs normal de-mosaic processing on a pixel at the position (Y, X') in the image "B" (S15). Thereby, a red pixel value Rb, a green pixel value Gb, and a blue pixel value Bb at the position (Y, X') in the image "B" are obtained.

Since the image "B" is out of focus, artifacts are difficult to occur in the pixel values Rb, Gb, and Bb. However, the size of the circle of confusion of the image "B" is large, and high frequency components are lost.

Subsequently, the de-mosaic module for image "A" 43 performs the de-mosaic processing on a pixel at the position (Y, X) in the image "A" by using the obtained pixel values Rb, Gb, and Bb of the image "B" (S16). For example, when the G image pickup element is located at the position (Y, X) and the pixel value thereof is Ga, the de-mosaic module for image "A" 43 calculates the red pixel value Ra and the blue pixel value Ba by the formula (1) described below.

$$Ra = Rb*(Ga/Gb)$$

$$Ba = Bb*(Ga/Gb) \quad (1)$$

However, when the denominator Gb is 0 or when the Ga/Gb is large even if the denominator Gb is not 0, the pixel values Ra and Ba may not be calculated correctly. Therefore, in such a case, normal de-mosaic processing or exception handling by the formula (2) described below may be performed.

$$Ra = Rb - Gb + Ga$$

$$Ba = Bb - Gb + Ga \quad (2)$$

As a more specific example, when Ga/Gb is smaller than or equal to 4, the above formula (1) is used, when $4 \leq Ga/Gb \leq 20$, a result of the above formula (1) and a result of the above formula (2) are blended at a ratio of (20−Ga/Gb):(Ga/Gb−4), and when the Ga/Gb is greater than or equal to 20, the above formula (2) may be used.

Similarly, the de-mosaic module 22 calculates the green pixel value Ga and the blue pixel value Ba when the R image pickup element is located at the position (Y, X) and the red pixel value Ra and the green pixel value Ga when the B image pickup element is located at the position (Y, X).

The above process is performed on all positions (Y, X) in the image "A" (S17).

In the above process, when the image "A" is in focus, the pixel values Ra to Ba of the image "A" are used without change (without removing high frequency components), thereby, preventing the resolution feeling from decreasing. Further, the pixel values Rb to Bb of the image "B" which is out of focus are used, thereby, suppressing artifacts.

By the above de-mosaic processing, an image, on which the de-mosaic processing is performed on, is generated and each pixel thereof includes pixel values of R, G, and B. The de-mosaic module 22 may generate an image formed by pixels in the Bayer arrangement by enlarging the image obtained by the de-mosaic processing and then appropriately decimating the pixels. This is because an output of a normal image pickup apparatus is the Bayer arrangement. Enlarging the image can reduce generation of artifacts in subsequent signal processing.

As shown in FIG. 12, the threshold value BokehTh may be smaller than or equal to a value at which the size of the circle of confusion BokehA(D) of the image pickup apparatus 1a coincide with the size of the circle of confusion BokehB(D) of the image pickup apparatus 1b. By setting in this manner, when the image "A" is in focus, the image "B" is always more out of focus than the image "A", so that the accuracy of the de-mosaic can be improved.

As described above, in the first embodiment, the de-mosaic processing is performed by using two images having different focus positions. Therefore, it is possible to obtain an image in which artifacts are suppressed and which has a high resolution feeling. The two image pickup apparatuses 1a and 1b whose resolution is not so high are used, so that downsizing can be achieved.

Although, in the image processing system in FIG. 1, an example is shown in which the two image pickup apparatuses 1a and 1b are used, three or more image pickup apparatuses having focus positions different from each other may be used. In this case, images captured by any two of the image pickup apparatuses may be processed as the image "A" and the image "B". It can be assumed, for example, that the image "A" is the most in focus image, and the image "B" is the second most in focus image following the image "A".

Although the image pickup elements in the Bayer arrangement are illustrated in FIG. 2, the arrangement of the image pickup elements are not limited to this. De-mosaic processing on an arrangement other than the Bayer arrangement is processing in which when there is one pixel value captured by an image pickup element and other pixel value(s) is(are) absent, the absent pixel value(s) is(are) estimated.

Second Embodiment

In a second embodiment described below, a deep-focus output image is generated in which bokeh size is changed and a wide range is in focus from an object near the image pickup apparatuses 1a and 1b to an object far therefrom.

Figure 13:
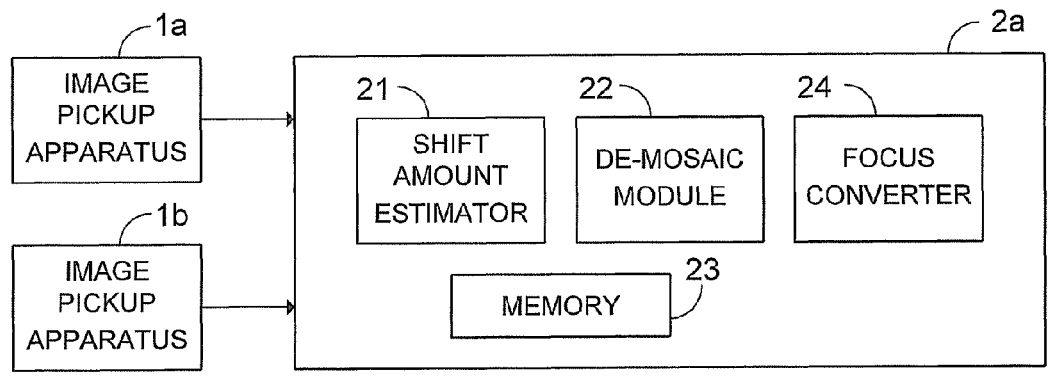
FIG. 13 is a block diagram showing a schematic configuration of an image processing system according to the second embodiment.

FIG. 13 is a block diagram showing a schematic configuration of an image processing system according to the second embodiment. In FIG. 13, the same components as those in FIG. 1 are denoted by the same reference numerals and the differences will be mainly described below.

In the first embodiment, an example is described in which the de-mosaic processing is performed only on the image "A". However, the de-mosaic module 22 of the present embodiment performs the de-mosaic processing not only on the image "A", but also on the image "B". Specifically, the de-mosaic module 22 performs normal de-mosaic processing on out-of-focus pixels in the image "B" and performs the de-mosaic processing on in-focus pixels in the image "B" by also using corresponding pixels in the image "A". In the description below, the image "A" and the image "B" on which the de-mosaic processing has been performed are referred to as a de-mosaic image "A" and a de-mosaic image "B", respectively. The resolution of the de-mosaic image "A" is the same as that of the image "A".

An image processing apparatus 2a in the image processing system in FIG. 13 further includes a focus converter 24. The focus converter 24 generates a deep-focus output image by selecting an in-focus image for each pixel among the de-mosaic image "A" and the de-mosaic image "B".

Figure 14:
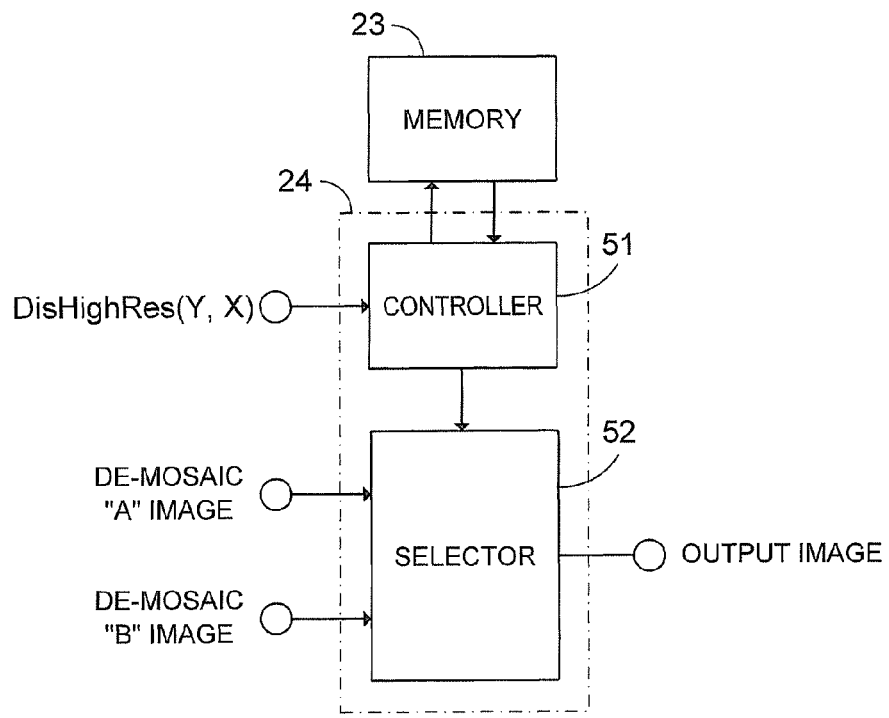
FIG. 14 is a block diagram showing an example of an internal configuration of the focus converter 24.

FIG. 14 is a block diagram showing an example of an internal configuration of the focus converter 24. The focus converter 24 includes a controller 51 and a selector 52. The controller 51 determines which image has less bokeh, the de-mosaic image "A" or the de-mosaic image "B", by using the high resolution disparity map DisHighRes(Y, X) generated by the shift amount estimator 21 and the relationship of FIG. 3 stored in the memory 23, to control the selector 52. The selector 52 selects pixels of the image which has less bokeh and forms an output image using the selected pixels.

Figure 15:
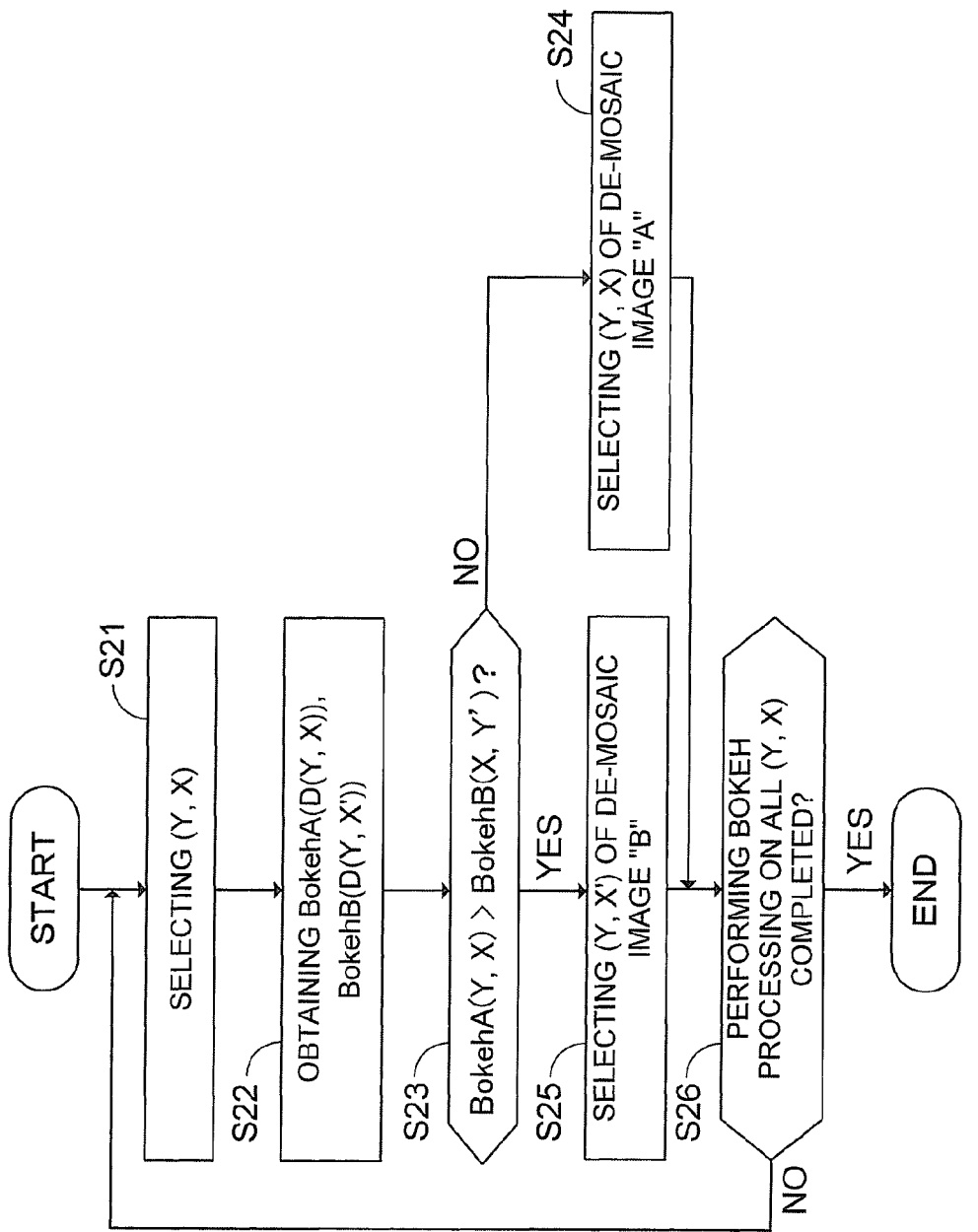
FIG. 15 is a flowchart showing an example of a processing operation of the focus converter 24.
Figure 16:
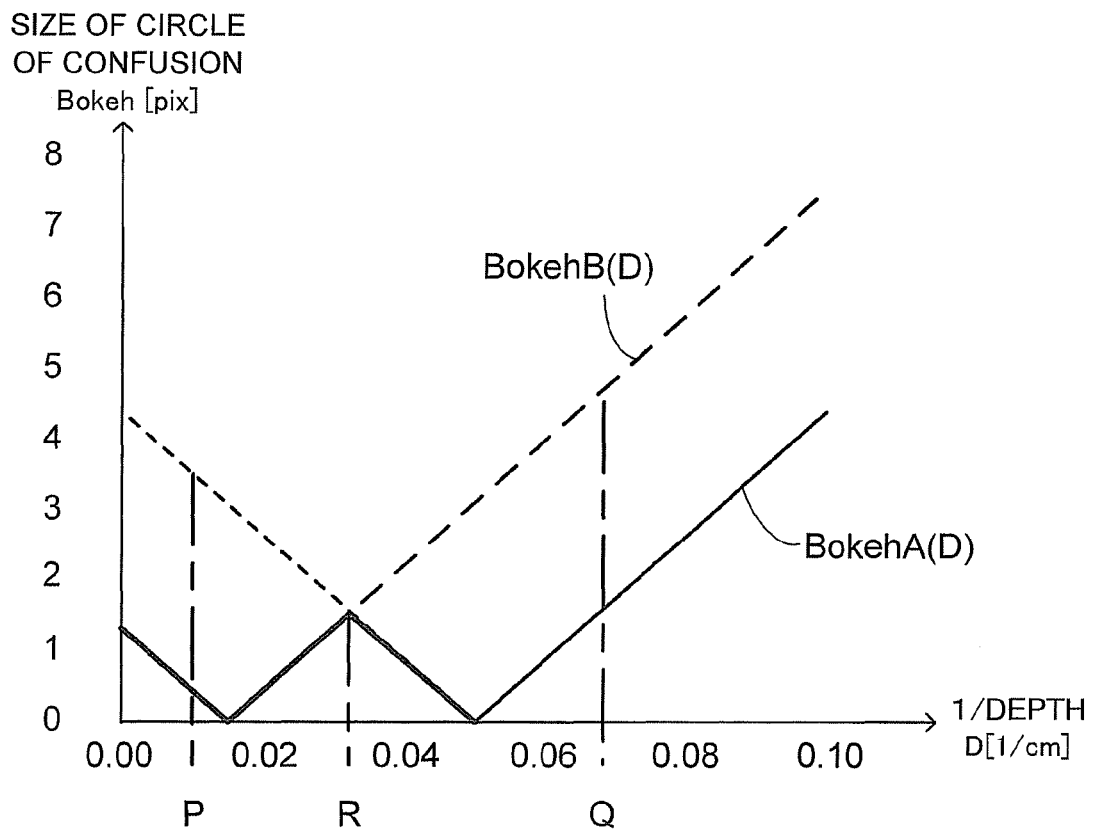
FIG. 16 is a diagram for explaining the processing operation of the focus converter 24.

FIG. 15 is a flowchart showing an example of a processing operation of the focus converter 24. FIG. 16 is a diagram for explaining the processing operation of the focus converter 24.

First, the controller 51 selects a position (Y, X) (S21). Although the position (Y, X) may be selected in any order, for example, it is assumed that the position (Y, X) is selected in order of raster scan from upper left to lower right. Here, as described in the first embodiment, the position (Y, X) in the image "A" corresponds to a position (Y, X+DisHighRes(Y, X))=(Y, X') in the image "B".

Subsequently, the controller 51 obtains the depth D(Y, X) of the position (Y, X) in the image "A" from the high resolution disparity map DisHighRes(Y, X). The depth D (Y, X) is also the depth of the position (Y, X') in the image "B". Then, the controller 51 obtains the sizes of the circle of confusion BokehA(D(Y, X)) and BokehB(D(Y, X')) at 1/depth D(Y, X) by using the relationship shown in FIG. 3 (S22).

As indicated by a point P in FIG. 16, when BokehA(D(Y, X))>BokehB(D(Y, X')) (YES in S23), the de-mosaic image "B" is more in-focus. Therefore, the selector 52 selects a pixel value at the position (Y, X') in the de-mosaic image "B" and sets the pixel value to a pixel value at the position (Y, X) in the output image (S25). Since the pixel value here is a pixel value after the de-mosaic processing, the pixel value includes values of R, G, and B.

On the other hand, as indicated by a point Q in FIG. 16, when BokehA(D(Y, X)) 5. BokehB(D(Y, X')) (NO in S23), the de-mosaic image "A" is more in-focus. Therefore, the selector 52 selects a pixel value at the position (Y, X) in the de-mosaic image "A" and sets the pixel value to a pixel value at the position (Y, X) in the output image (S24).

The process described above is schematically shown in FIG. 16. When the 1/depth D is smaller than a horizontal axis value of an intersection point R of BokehA(D) and BokehB (D), the pixel value at the position (Y, X') in the de-mosaic image "B" is selected, and when the 1/depth D is greater than the horizontal axis value of the intersection point R of BokehA(D) and BokehB(D), the pixel value at the position (Y, X) in the de-mosaic image "A" is selected, and then the output image is formed (S25).

When the luminance and/or the color balance of the de-mosaic image "A" and the de-mosaic image "B" are different from each other, the focus converter 24 may form the output image after adjusting the luminance and/or the color balance in advance.

The processes described in S21 to S25 are performed on all positions (Y, X) (S26). Thereby, the pixel values at the positions (Y, X) in the image "A" or the pixel values at the positions (Y, X') in the image "B" are transferred to the positions (Y, X) in the output image, so that the output image in which a wide depth range is in focus can be obtained.

Figure 17:
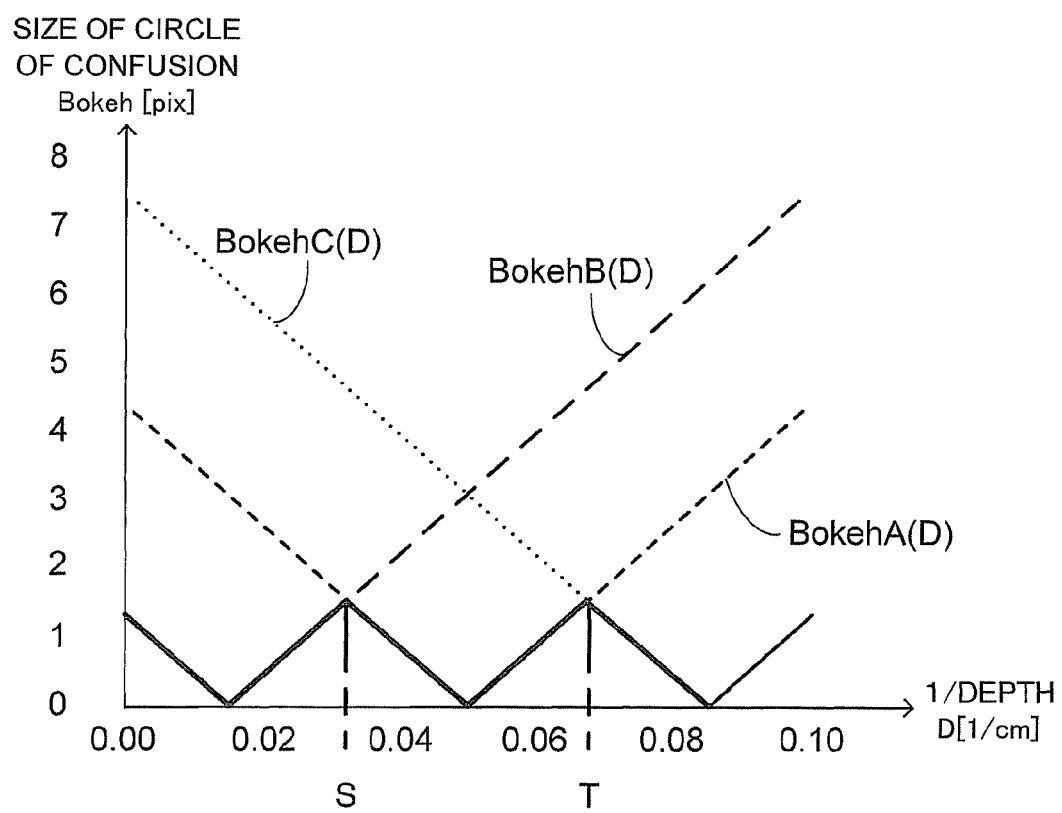
FIG. 17 is a diagram for explaining processing operation of the focus converter 24.

In the above processes, it is assumed that the two image pickup apparatuses 1a and 1b are used. By using more than two, for example, three image pickup apparatuses 1a to 1c, it is possible to obtain a further deep-focus output image. FIG. 17 is a diagram for explaining processing operation of the focus converter 24 when further using the image pickup apparatus 1c whose focus position is 12 cm. In FIG. 17, a point S is an intersection point of BokehA(D) and BokehB(D) and a point T is an intersection point of BokehA(D) and BokehC (D). In this case, when the 1/depth D is smaller than or equal to the horizontal axis value of the point S, the focus converter 24 uses the de-mosaic image "B", when the 1/depth D is greater than the horizontal axis value of the point S and smaller than the horizontal axis value of the point T, the focus converter 24 uses the de-mosaic image "A", and when the 1/depth D is greater than or equal to the horizontal axis value of the point T, the focus converter 24 uses an image "C". As a result, the size of the circle of confusion is smaller than or equal to 1.5 pixels in substantially the whole depth range, so that an extremely deep focus output image is generated.

In this way, in the second embodiment, the most focused image is selected from a plurality of images having different focus positions, thereby, generating a deep focus image.

Third Embodiment

The focus converter 24 of the second embodiment described above generates a deep focus image. On the other hand, the focus converter 24 of a third embodiment performs a refocus process which converts the focuses of the de-mosaic image "A" and the de-mosaic image "B" into predetermined target focuses. In the following description, the differences from the second embodiment will be mainly described.

Figure 18:
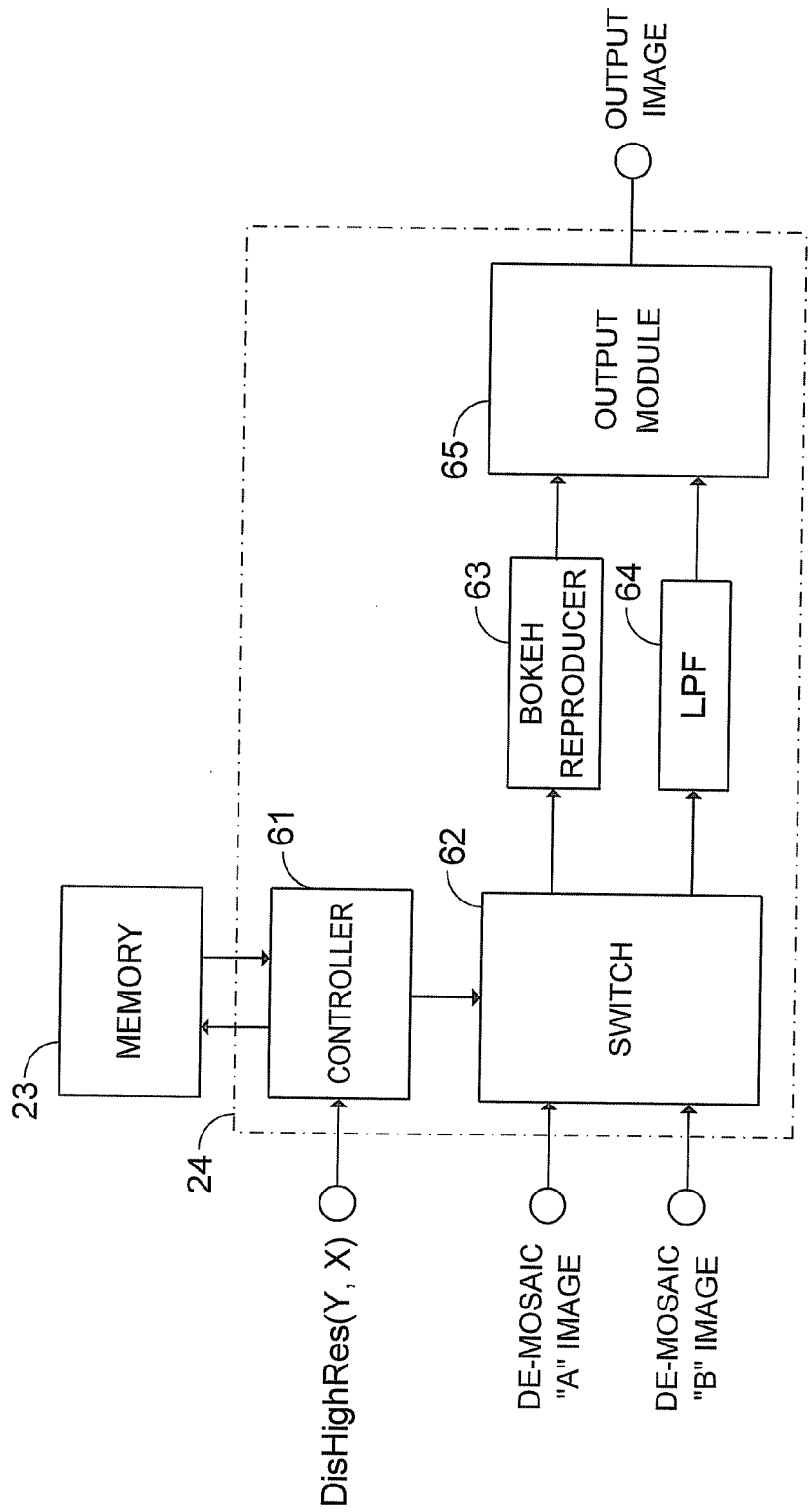
FIG. 18 is a diagram showing an example of an internal configuration of the focus converter 24.

FIG. 18 is a diagram showing an example of an internal configuration of the focus converter 24. The focus converter 24 includes a controller 61, a switch 62, a bokeh reproducer 63, an LPF 64, and an output module 65.

The controller 61 determines which image should be used, the de-mosaic image "A" or the de-mosaic image "B", by using the high resolution disparity map DisHighRes(Y, X) generated by the shift amount estimator 21 and the relationship of FIG. 3 stored in the memory 23, to control the switch 62. The switch 62 selects the de-mosaic image "A" or the de-mosaic image "B" according to the control of the controller 61 and outputs the selected image to the bokeh reproducer 63 or the LPF 64. When the selected image has more bokeh than the target focus, the bokeh reproducer 63 performs a process to restore the bokeh image. When the selected image is more in focus than the target focus, the LPF 64 performs a low pass filtering process to blur the image (to make the image out of focus). The output module 65 generates an output image by using pixels processed by the bokeh reproducer 63 or the LPF 64.

Figure 19:
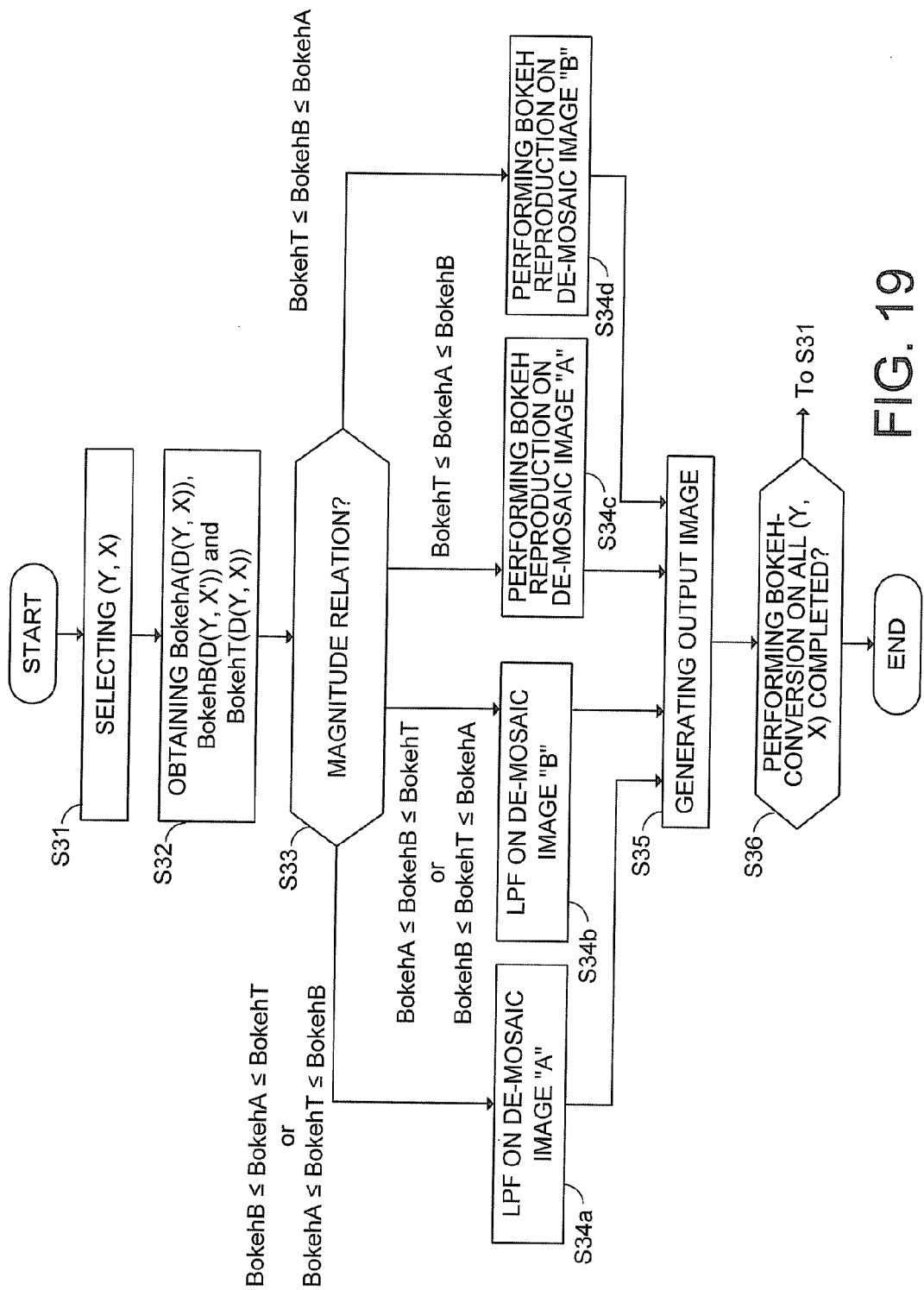
FIG. 19 is a flowchart showing an example of a processing operation of the focus converter 24.
Figure 20:
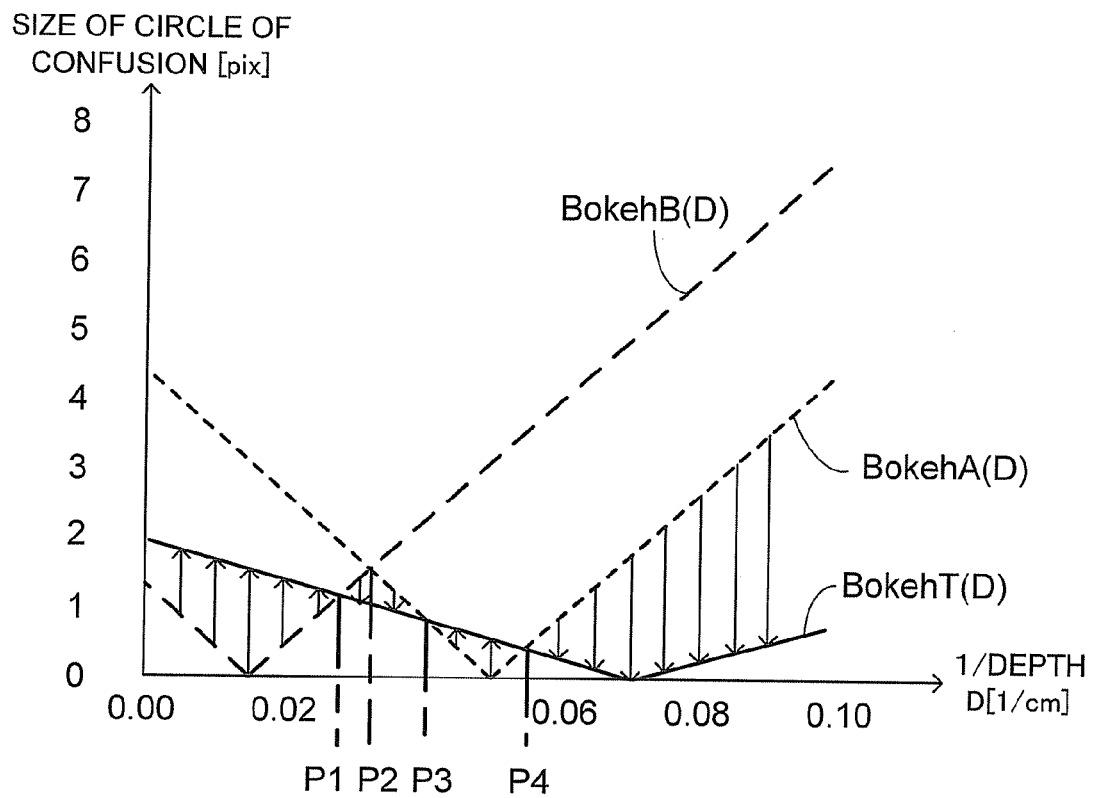
FIG. 20 is a diagram for explaining the processing operation of the focus converter 24.

FIG. 19 is a flowchart showing an example of a processing operation of the focus converter 24. FIG. 20 is a diagram for explaining the processing operation of the focus converter 24. As shown in FIG. 20, a relationship BokehT(D) between the target focus, that is, the size of the circle of confusion, and the depth D is predetermined in advance and stored in the memory 23. FIG. 20 is an example of converting the focus position to 1/0.07=14.2 cm. In FIG. 20, a point P1 is an intersection point of BokehT(D) and BokehB(D), a point P2 is an intersection point of BokehA(D) and BokehB(D), and points P3 and P4 are intersection points of BokehT(D) and BokehA(D).

First, the controller 61 selects a position (Y, X) (S31) in the same manner as in the second embodiment, and obtains the sizes of the circle of confusion BokehA(D(Y, X)) and BokehB (D(Y, X')) at the position (Y, X) (S32). Further, the controller 61 obtains the size of the circle of confusion BokehT(D(Y, X)) corresponding to the depth D (Y, X) at the position (Y, X) in the image "A" by using the relationship shown in FIG. 20 (S32). Then, the controller 61 performs the process described below according to a magnitude relation of BokehA(D(Y, X)), BokehB(D(Y, X')), and BokehT(D(Y, X)) (S33).

A case where BokehB(D(Y,X'))≤BokehA(D(Y,X))
≤BokehT(D(Y,X)) or BokehA(D(Y,X))≤BokehT(D
(Y,X))≤BokehB(D(Y,X')) (from P3 to P4 in FIG.
20)                                                           (I)

At this time, the de-mosaic image "A" is more in focus than the target focus and nearer to the target focus than the de-mosaic image "B". Therefore, the switch 62 outputs the de-mosaic image "A" to the LPF 64 by the control of the controller 61. The LPF 64 performs a low pass filtering process on an area around the position (Y, X) in the de-mosaic image "A" to blur the de-mosaic image "A" (S34a). For example, the LPF 64 performs a Gaussian filter process, whose radius is a difference between the size of the circle of confusion of the de-mosaic image "A" and the size of the circle of confusion of BokehT(D(Y, X)), on the de-mosaic image "A". Thereby, an image whose size of the circle of confusion is near BokehT(D(Y, X)) can be obtained.

A case where BokehA(D(Y,X))≤BokehB(D(Y,X'))
≤BokehT(D(Y,X)) or BokehB(D(Y,X'))≤BokehT
(D(Y,X))≤BokehA(D(Y,X)) (smaller than or equal
to P1 in FIG. 20).                               (II)

At this time, the de-mosaic image "B" is more in focus than the target focus and nearer to the target focus than the de-mosaic image "A". Therefore, the switch 62 outputs the de-mosaic image "B" to the LPF 64 by the control of the controller 61. The LPF 64 performs a low pass filtering process on an area around the position (Y, X') in the de-mosaic image "B" to blur the de-mosaic image "B" (S34b). For example, the LPF 64 performs a Gaussian filter process, whose radius is a difference between the size of the circle of confusion of the de-mosaic image "B" and the size of the circle of confusion of BokehT(D(Y, X)), on the de-mosaic image "B". Thereby, an image whose size of the circle of confusion is near BokehT(D(Y, X)) can be obtained.

A case where BokehT(D(Y,X))≤BokehA(D(Y,X))
≤BokehB(D(Y,X')) (from P2 to P3, and greater
than or equal to P4 in FIG. 20)                            (III)

At this time, there is no image that is more in focus than the target focus. However, the de-mosaic image "A" is nearer to the target focus. Therefore, the switch 62 outputs the de-mosaic image "A" to the bokeh reproducer 63 by the control of the controller 61. The bokeh reproducer 63, for example, restores the bokeh image by performing an inverse transform of PSF (Point Spread Function), a super resolution conversion, or a high frequency emphasis process on an area around the position (Y, X) in the de-mosaic image "A".

A case where BokehT(D(Y,X))≤BokehB(D(Y,X'))
≤BokehA(D(Y,X)) (from P1 to P2 in FIG. 20)              (IV)

At this time, there is no image that is more in focus than the target focus. However, the de-mosaic image "B" is nearer to the target focus. Therefore, the switch 62 outputs the de-mosaic image "B" to the bokeh reproducer 63 by the control of the controller 61. The bokeh reproducer 63, for example, restores the bokeh image by performing an inverse transform of PSF (Point Spread Function), a super resolution conversion, or a high frequency emphasis process on an area around the position (Y, X') in the de-mosaic image "B".

The output module 65 sets a pixel value at the position (Y, X) in the de-mosaic image "A" or a pixel value at the position (Y, X') in the de-mosaic image "B", which is processed by the bokeh reproducer 63 or the LPF 64 and which is obtained in the manner as described above, to the pixel value at the position (Y, X) in the output image (S35).

The above process is performed on all positions (S36), so that the output image whose focus position is changed is obtained.

Also in the present embodiment, three or more image pickup apparatuses having focus positions different from each other may be used. Also in this case, the output image may be formed by selecting one image according to a relationship between the size of the circle of confusion of each image pickup apparatus and the target focus and performing a blurring process by a low pass filter or a bokeh image restoration process.

In this way, in the third embodiment, an image whose focus is converted can be generated by using images obtained by a plurality of image pickup apparatuses having focus positions different from each other. Thereby, even though the fixed focus image pickup apparatuses 1a and 1b are used, an auto-focus function can be implemented.

In each of the first to the third embodiments described above, examples are illustrated in which the fixed focus image pickup apparatuses are used. On the other hand, each of a plurality of image pickup apparatuses may have an auto-focus (AF) function.

Figure 21:
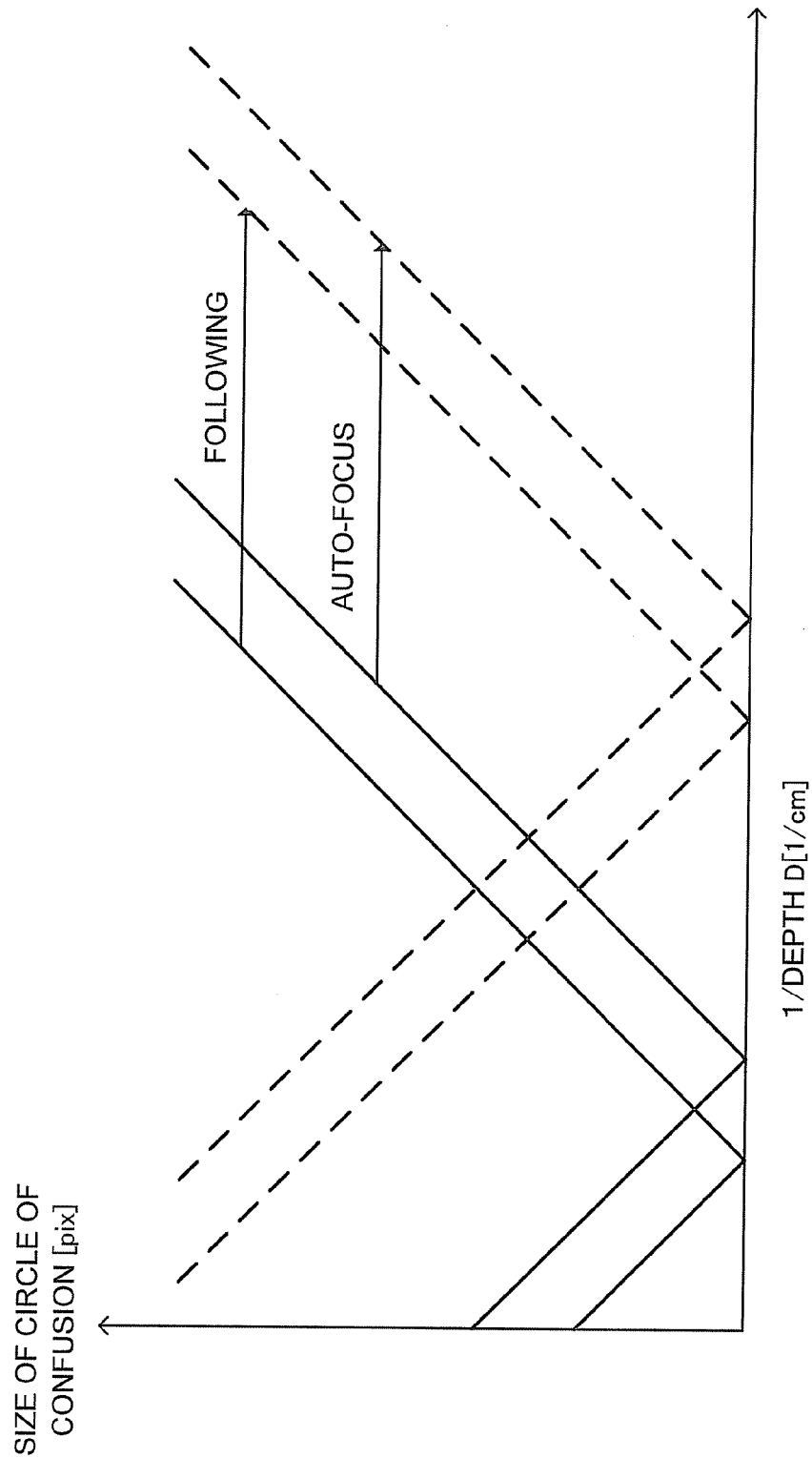
FIG. 21 is a diagram showing a state of focus position adjustment when using image pickup apparatuses having the auto-focus function.

FIG. 21 is a diagram showing a state of focus position adjustment when using image pickup apparatuses having the auto-focus function. In this case, one image pickup apparatus automatically adjusts the focus position according to the object. The other image pickup apparatus adjusts the focus position to a position, which is near the focus position of the one image pickup apparatus and at which artifacts do not occur, in conjunction with the focus position of the one image pickup apparatus. To suppress the artifacts, for example, the size of the circle of confusion with the other image pickup apparatus may be set to two or more pixels. When the image pickup apparatuses having the auto-focus function are used, the auto-focus function can be realized without using the focus converter 24 and the auto-focus can be quickly performed by using the depth (shift amount) estimated by the stereo matching process, and furthermore, the image pickup apparatuses can be applied to three-dimensional photography.

FIGS. 22A to 22H are diagrams showing an arrangement example of image pickup apparatuses. In the embodiments described above, as shown in FIG. 22A, an example is illustrated in which a plurality of image pickup apparatuses are arranged in the horizontal direction. However, various other arrangements can be considered. For example, two image pickup apparatuses may be arranged in the vertical direction (FIG. 22B) or three image pickup apparatuses may be arranged in an "L" shape (FIG. 22C). Alternatively, it is possible to arrange two image pickup apparatuses in the vertical direction and two image pickup apparatuses in the horizontal direction at the same time (FIG. 22D). Three image pickup apparatuses are arranged in the horizontal direction and one image pickup apparatus may be further placed above the central image pickup apparatus (FIG. 22E). Two image pickup apparatuses are arranged in the horizontal direction and one image pickup apparatus may be further placed above the center between the two image pickup apparatuses (FIG. 22F). In FIGS. 22A to 22F, the image pickup apparatuses are closely located, for example, the image pickup apparatuses are arranged with a gap of 8 mm between them. On the other hand, as shown in FIG. 22G, two pairs of image pickup apparatuses arranged closely in the vertical direction may be arranged somewhat apart from each other in the horizontal direction, for example, with a gap of 3 to 4 cm between them. Thereby, the image pickup apparatuses can be applied to stereoscopic photography. Similarly, as shown in FIG. 22H, two pairs of image pickup apparatuses arranged closely in the horizontal direction may be arranged somewhat apart from each other in the vertical direction, for example, with a gap of 3 to 4 cm between them.

(Software)

At least a part of the image processing system explained in the above embodiments can be formed of hardware or software. When the image processing system is partially formed of the software, it is possible to store a program implementing at least a partial function of the image processing system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the image processing system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image processing device comprising:
a shift estimator configured to estimate a shift amount between a first pixel in a first image and a corresponding second pixel in a second image, the first image being taken by a first image pickup apparatus, the second image being taken by a second image pickup apparatus, a focus position of the first image pickup apparatus being different from a focus position of the second image pickup apparatus; and
a de-mosaic module configured to generate a first de-mosaic image by performing de-mosaic processing on each pixel in the first image using a pixel value of the corresponding second pixel, when the first pixel is determined to be in a state of in-focus based on the shift amount,
wherein the de-mosaic module determines that the first pixel is in the state of in-focus when a first size of a first circle of confusion of the first image pickup apparatus at the shift amount of the first pixel is smaller than a first value, and
the first value is equal to or less than a size of a circle of confusion which makes the first size equal to a second size of a second circle of confusion of the second image pickup apparatus.

2. An image processing device comprising:
a shift estimator configured to estimate a shift amount between a first pixel in a first image and a corresponding second pixel in a second image, the first image being taken by a first image pickup apparatus, the second image being taken by a second image pickup apparatus, a focus position of the first image pickup apparatus being different from a focus position of the second image pickup apparatus; and
a de-mosaic module configured to generate a first de-mosaic image by performing de-mosaic processing on each pixel in the first image using a pixel value of the corresponding second pixel, when the first pixel is determined to be in a state of in-focus based on the shift amount,
wherein the de-mosaic module performs the de-mosaic processing using a pixel value of the corresponding second pixel on which de-mosaic processing has been performed, when the first pixel is determined to be in the state of in-focus.

3. The device of claim 2, wherein each of the first image pickup apparatus and the second image pickup apparatus comprises:
a first pickup element;
a second pickup element; and
a third pickup element,
each of the first pixel in the first image and each of the second pixel in the second image before the de-mosaic processing, comprises one of:
a first pixel value captured by the first pickup element;
a second pixel value captured by the second pickup element; and
a third pixel value captured by the third pickup element,
the de-mosaic module calculates the first pixel value and the third pixel value based on following equations (1), when a pixel which is a target of the de-mosaic processing comprises the second pixel value, $$Ra=Rb*(Ga/Gb)$$

$$Ba=Bb*(Ga/Gb) \qquad (1)$$

where
the Ra is the first pixel value of the first pixel;
the Ga is the second pixel value of the first pixel;
the Ba is the third pixel value of the first pixel;
the Rb is the first pixel value of the second pixel, on which the de-mosaic processing has been performed, corresponding to the first pixel;
the Gb is the second pixel value of the second pixel, on which the de-mosaic processing has been performed, corresponding to the first pixel; and
the Bb is the third pixel value of the second pixel, on which the de-mosaic processing has been performed, corresponding to the first pixel.

4. The device of claim 2, wherein the shift estimator is configured to
generate a first shrink image by shrinking the first image by a first shrink rate;
generate a second shrink image by shrinking the second image by the first shrink rate;
estimate a shift amount between each pixel in the first shrink image and each corresponding pixel in the second shrink image for each pixel in the first shrink image;
generate a first LPF image and a second LPF image by low pass filter processing on the first image and the second image respectively according to the shift amount of the first shrink image corresponding to a pixel in the first image; and
estimate the shift amount between a pixel in the first image and a corresponding pixel in the second image by performing stereo-matching processing on the first LPF image and the second LPF image, for each pixel in the first image.

5. The device of claim 2, wherein the de-mosaic module generates a second de-mosaic image by performing de-mosaic processing on each pixel in the second image using a pixel value of the corresponding first pixel, when the second pixel is determined to be in a state of in-focus based on the shift amount, and the device comprises a focus converter configured to generate an output image using the first de-mosaic image and the second de-mosaic image, a focus of the output image being different from focuses of the first image and the second image.

6. The device of claim 5, wherein the focus converter generates the output image by selecting a pixel in a state of more in-focus among a pixel in the first de-mosaic image and a corresponding pixel in the second de-mosaic image, a focus of the output image being deeper than a focus of the first image and the second image.

7. The device of claim 5, wherein the focus converter generates the output image, the focus of the output image being different from the focuses of the first image and the second image, by selecting one of:
 a pixel obtained by performing low pass filter processing on a pixel in the first de-mosaic image;
 a pixel obtained by performing low pass filter processing on a pixel in the second de-mosaic image;
 a pixel obtained by bokeh reproduction processing on a pixel in the first de-mosaic image; and
 a pixel obtained by bokeh reproduction processing on a pixel in the second de-mosaic image.

8. The device of claim 2, wherein the de-mosaic module performs de-mosaic processing on the first pixel without using, when the first pixel is not determined to be in the state of in-focus based on the shift amount, a pixel value of the corresponding second pixel.

9. An image processing system comprising:
 a first image pickup apparatus configured to obtain a first image, the first image pickup apparatus comprising a first focus position;
 a second image pickup apparatus configured to obtain a second image, the second image pickup apparatus comprising a second focus position different from the first focus position;
 a shift estimator configured to estimate a shift amount between a first pixel in the first image and a corresponding second pixel in the second image; and
 a de-mosaic module configured to generate a first de-mosaic image by performing de-mosaic processing on each pixel in the first image using a pixel value of the corresponding second pixel, when the first pixel is determined to be in a state of in-focus based on the shift amount,
 wherein the de-mosaic module determines that the first pixel is in the state of in-focus when a first size of a first circle of confusion of the first image pickup apparatus at the shift amount of the first pixel is smaller than a first value, and
 the first value is equal to or less than a size of a circle of confusion which makes the first size equal to a second size of a second circle of confusion of the second image pickup apparatus.

10. An image processing system comprising:
 a first image pickup apparatus configured to obtain a first image, the first image pickup apparatus comprising a first focus position;
 a second image pickup apparatus configured to obtain a second image, the second image pickup apparatus comprising a second focus position different from the first focus position;
 a shift estimator configured to estimate a shift amount between a first pixel in the first image and a corresponding second pixel in the second image; and
 a de-mosaic module configured to generate a first de-mosaic image by performing de-mosaic processing on each pixel in the first image using a pixel value of the corresponding second pixel, when the first pixel is determined to be in a state of in-focus based on the shift amount,
 wherein the de-mosaic module performs the de-mosaic processing using a pixel value of the corresponding second pixel on which de-mosaic processing has been performed, when the first pixel is determined to be in the state of in-focus.

11. The system of claim 10, wherein each of the first image pickup apparatus and the second image pickup apparatus comprises:
 a first pickup element;
 a second pickup element; and
 a third pickup element,
 each pixel in the first image and each pixel in the second image, before the de-mosaic processing, comprise one of:
 a first pixel value captured by the first pickup element;
 a second pixel value captured by the second pickup element; and
 a third pixel value captured by the third pickup element,
 the de-mosaic module calculates the first pixel value and the third pixel value based on following equations (1), when a pixel which is a target of the de-mosaic processing comprises the second pixel value, $$Ra = Rb*(Ga/Gb)$$

$$Ba = Bb*(Ga/Gb) \qquad (1)$$

where
 the Ra is the first pixel value of the first pixel;
 the Ga is the second pixel value of the first pixel;
 the Ba is the third pixel value of the first pixel;
 the Rb is the first pixel value of the second pixel, on which the de-mosaic processing has been performed, corresponding to the first pixel;
 the Gb is the second pixel value of the second pixel, on which the de-mosaic processing has been performed, corresponding to the first pixel; and
 the Bb is the third pixel value of the second pixel, on which the de-mosaic processing has been performed, corresponding to the first pixel.

12. The system of claim 10, wherein the shift estimator is configured to:
 generate a first shrink image by shrinking the first image by a first shrink rate;
 generate a second shrink image by shrinking the second image by the first shrink rate;
 estimate a shift amount between each pixel in the first shrink image and each corresponding pixel in the second shrink image for each pixel in the first shrink image;
 generate a first LPF image and a second LPF image by low pass filter processing on the first image and the second image respectively according to the shift amount of the first shrink image corresponding to a pixel in the first image; and
 estimate the shift amount between a pixel in the first image and a corresponding pixel in the second image by performing stereo-matching processing on the first LPF image and the second LPF image for each pixel in the first image.

13. The system of claim 10, wherein the de-mosaic module generates a second de-mosaic image by performing de-mosaic processing on each pixel in the second image using a pixel value of the corresponding first pixel, when the second pixel is determined to be in a state of in-focus based on the shift amount, and the system comprises a focus converter configured to generate an output image using the first de-mosaic image and the second de-mosaic image, a focus of the output image being different from focuses of the first image and the second image.

14. The system of claim 13, wherein the focus converter generates the output image by selecting a pixel in a state of more in-focus among a pixel in the first de-mosaic image and a corresponding pixel in the second de-mosaic image, a focus of the output image being deeper than a focus of the first image and the second image.

15. The system of claim 10, wherein the first image pickup apparatus, the second image pickup apparatus, the shift amount estimator and the de-mosaic module are formed on one semiconductor chip.

16. The system of claim 10, wherein each of the first image pickup apparatus and the second image pickup apparatus comprises auto-focus function, the first pickup apparatus adjusts the first focus position according to a position of an object, and the second pickup apparatus adjusts the second focus position in conjunction with the first focus position.

* * * * *